(12) United States Patent
Andronescu et al.

(10) Patent No.: US 12,198,520 B2
(45) Date of Patent: Jan. 14, 2025

(54) SYSTEMS AND METHODS FOR REAL-TIME OCCUPANCY DETECTION AND TEMPERATURE MONITORING OF COOKING UTENSILS FOR FOOD PROCESSING ASSISTANCE

(71) Applicant: Samsung Electronics Company, Ltd., Suwon si (KR)

(72) Inventors: Tiberiu A. Andronescu, Ontario (CA); Philipp Schoessler, Scotts Valley, CA (US); Brian Harms, San Jose, CA (US); Megan Rowe, San Jose, CA (US); Jun Yeon Cho, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 17/592,434

(22) Filed: Feb. 3, 2022

(65) Prior Publication Data
US 2023/0245543 A1    Aug. 3, 2023

(51) Int. Cl.
*G08B 17/10*    (2006.01)
*F24C 15/20*    (2006.01)
(Continued)

(52) U.S. Cl.
CPC .............. *G08B 17/10* (2013.01); *F24C 15/20* (2013.01); *G01K 17/20* (2013.01); *G05B 15/02* (2013.01);
(Continued)

(58) Field of Classification Search
CPC ........... H05K 7/20836; H05K 7/20272; H05K 7/2079; H05K 7/1492; H05K 7/20772;
(Continued)

(56) References Cited

U.S. PATENT DOCUMENTS 10,819,905 B1    10/2020 Liu
2013/0187781 A1    7/2013 Bach
(Continued)

FOREIGN PATENT DOCUMENTS

CN    104807048 A    7/2015
CN    111637500 A    9/2020
(Continued)

OTHER PUBLICATIONS

Cobley, Bennet "Student Innovation—OnionBot: Building a Robot Sous-Chef," Design Spark, "https://www.rs-online.com/designspark/student-innovation-onionbot-building-a-robot-sous-chef," 8 pages.
(Continued)

*Primary Examiner* — Mohammad Ali
*Assistant Examiner* — Dhruvkumar Patel

(57)    ABSTRACT

In one embodiment, a method for monitoring a kitchen environment by a smart hood includes accessing sensor data indicating parameters of a cooking utensil detected by the smart hood apparatus from sensors of the smart hood apparatus, wherein the sensors comprise one or more of a camera, a thermal sensor, an audio sensor, or an air particle sensor, determining occupancy information associated with the cooking utensil based on the sensor data by algorithms, wherein the occupancy information indicates whether the cooking utensil is placed within an allowable deviation from a target location on a cooktop, determining a thermal state of an accessory associated with the cooking utensil based on the sensor data by the algorithms, and sending instructions for presenting the occupancy information associated with the cooking utensil and the thermal state of the accessory.

20 Claims, 29 Drawing Sheets

(51) Int. Cl.
*G01K 17/20* (2006.01)
*G05B 15/02* (2006.01)
*G06V 20/64* (2022.01)
*G06V 20/68* (2022.01)
*H04L 12/28* (2006.01)

(52) U.S. Cl.
CPC .............. *G06V 20/64* (2022.01); *G06V 20/68* (2022.01); *H04L 12/2816* (2013.01); *G05B 2219/2613* (2013.01); *H04L 2012/285* (2013.01)

(58) Field of Classification Search
CPC ........... G06F 1/206; G06F 1/28; G06N 3/045; Y02D 10/00; G06V 10/267; G06V 10/48; G06V 10/56; G06V 10/82; G06V 20/52; H04L 12/2827; H04L 2012/2841; F24C 7/083; F24C 15/2021
See application file for complete search history.

(56) References Cited

U.S. PATENT DOCUMENTS

| | | | |
|---|---|---|---|
| 2016/0372005 A1 | 12/2016 | Bajpai | |
| 2018/0224127 A1* | 8/2018 | Lambert | H05B 1/0266 |
| 2019/0187636 A1 | 6/2019 | Fong | |
| 2019/0212060 A1* | 7/2019 | Lintonen | F24C 7/082 |
| 2020/0363778 A1 | 11/2020 | Mahapatra | |
| 2020/0367692 A1* | 11/2020 | Stipe | G06V 20/52 |
| 2021/0182667 A1 | 6/2021 | Maeng | |
| 2021/0247074 A1* | 8/2021 | Sinur | F24C 15/2021 |
| 2021/0251263 A1* | 8/2021 | Knighton | A23L 5/10 |
| 2022/0065457 A1* | 3/2022 | Bailey | H05B 3/746 |
| 2022/0156496 A1* | 5/2022 | Drake | G06V 20/52 |

FOREIGN PATENT DOCUMENTS

| | | |
|---|---|---|
| CN | 112747345 A | 5/2021 |
| DE | 102014220273 A1 | 4/2016 |
| DE | 102018201047 A1 | 7/2019 |
| EP | 3742052 A1 | 11/2020 |
| EP | 3975662 A1 | 6/2023 |
| JP | 2014 145518 A | 8/2014 |
| JP | 2015068542 A | 4/2015 |
| JP | 2017040430 A | 2/2017 |
| JP | 2020 176759 A | 10/2020 |
| WO | WO 19203075 A1 | 10/2019 |

OTHER PUBLICATIONS

Miso Robotics, "Miso Robotics Announces CookRight Software as a Standalone Offering to Increase Accuracy in Kitchens," Newsroom Press Release, https://misorobotics.com/newsroom/miso-robotics-announces-cookright-software-as-a-standalone-offering-to-increase-accuracy-in-kitchens/; Miso Robotics; 8 pgs.

Cooksy, "Our Story," https://www.facebook.com/cooksyofficial/, (https://www.instagram.com/cooksyofficial/), (https://www.youtube.com/channel/UCByFhkL_IKDU2-exqWK7UKQ), 3 pgs.

European Patent Office Communication Pursuant to Rule 164(1) EPC with Supplementary Partial European Search Report, Nov. 14, 2024.

* cited by examiner

Detected Pot Outline 1310

Detected Pot Outline 1320

SYSTEMS AND METHODS FOR REAL-TIME OCCUPANCY DETECTION AND TEMPERATURE MONITORING OF COOKING UTENSILS FOR FOOD PROCESSING ASSISTANCE

TECHNICAL FIELD

This disclosure relates generally to food processing assistance within kitchen environments, and in particular relates to real-time occupancy detection and temperature monitoring of cooking utensils

BACKGROUND

Our homes are increasingly trending towards a smart environment. One area of the smart home that has gained momentum recently is the smart kitchen environment. The kitchen is a very important room in any house. It is at the center of a family's day-to-day life and serves as a common gathering place for people to socialize, eat and cook together. With the goal of smart kitchen, a variety of products such as a smart oven, smart stove top and smart range hood have emerged on the market. These products serve more as a gateway to a fully integrated kitchen accessible from a user's personal computer or smartphone.

DESCRIPTION OF EXAMPLE EMBODIMENTS

Figure 1:
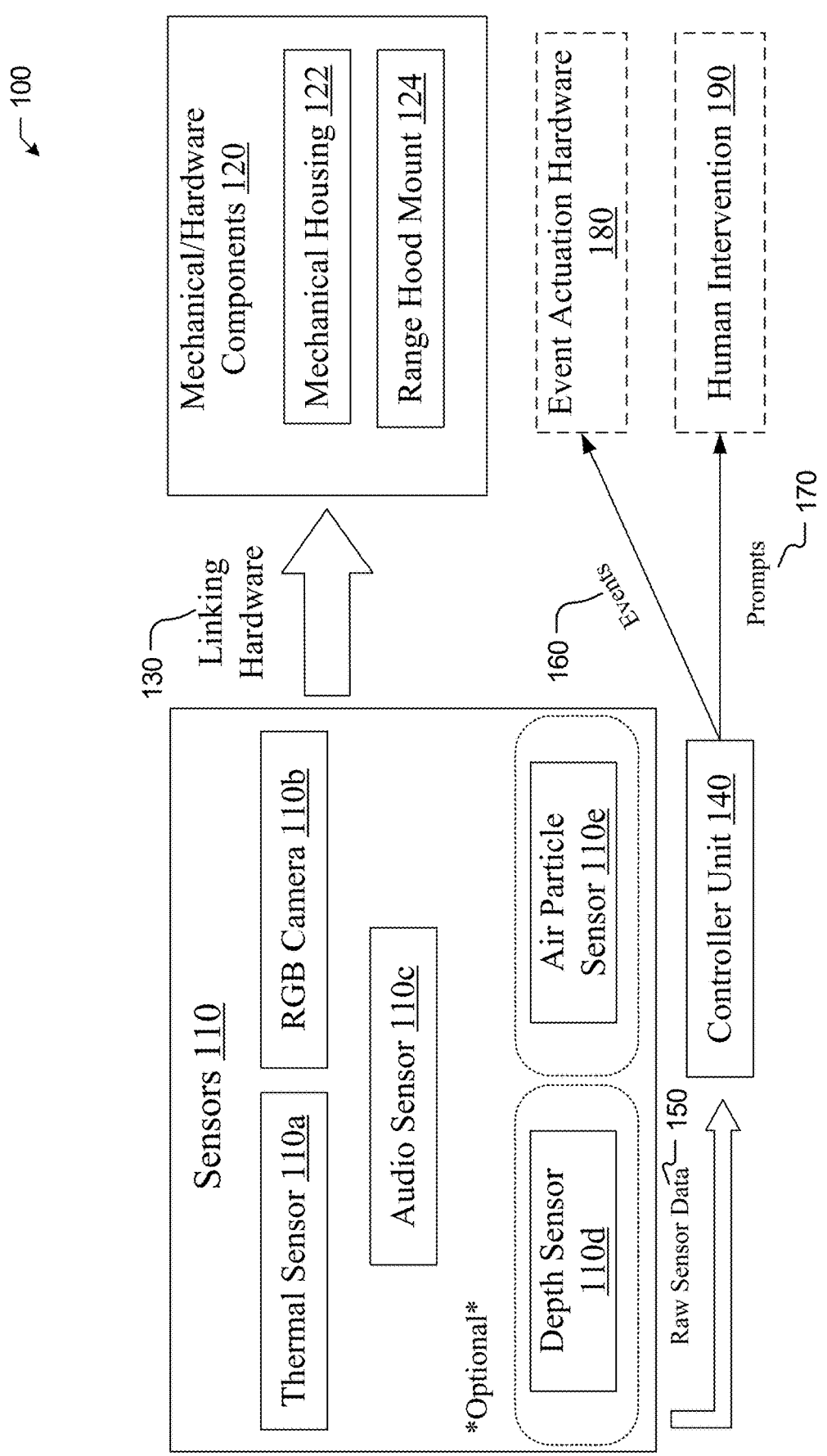
FIG. 1 illustrates an example architecture of a smart hood apparatus.

Real-Time Occupancy Detection and Temperature Monitoring of Cooking Utensils for Food Processing Assistance In particular embodiments, a smart hood apparatus may pertain to a stand-alone sensor apparatus unit. As an example and not by way of limitation, it may be mounted to an existing range hood in the kitchen. The apparatus unit may include, but not limited to, the following sensors: a temperature sensing unit, an RGB camera and an audio sensor. The sensors may be oriented to capture the activity on the entire cooktop/stovetop and relay this information to a controller device. The field of view (FOV) may be achieved individually by each sensor, or by merging the information from multiple sensors. The controller device may run algorithms using such information to provide a variety of assisting capabilities for a user cooking on the cooktop/stovetop. In particular embodiments, the smart hood apparatus may leverage sensor fusion, computer vision and sensor related technologies to make informed decisions for real-time occupancy detection and temperature monitoring of cooking utensils, which may result in a technical advantage of improved overall cooking experience and safety for the user. As an example and not by way of limitation, the features of the smart hood apparatus may include, but not limited to, occupancy detection, temperature monitoring for cooking utensils, smoke detection, general cooking assistance and food classification. Although this disclosure describes particular apparatus for with particular cooking assistances in a particular manner, this disclosure contemplates any suitable apparatus for any suitable cooking assistance in any suitable manner.

In particular embodiments, for monitoring a kitchen environment, the smart hood apparatus may access, from one or more sensors associated with the smart hood apparatus, sensor data indicating one or more parameters of a cooking utensil (e.g., a pot or a pan) detected by the smart hood apparatus. As an example and not by way of limitation, the one or more sensors may comprise one or more of a camera, a thermal sensor, or an audio sensor. The smart hood apparatus may then determine, based on the sensor data by one or more algorithms (e.g., machine-learning models), occupancy information associated with the cooking utensil. In particular embodiments, the occupancy information may indicate whether the cooking utensil is placed within an allowable deviation from a target location on a cooktop. The smart hood apparatus may then determine, based on the sensor data by the one or more algorithms, a thermal state of an accessory associated with the cooking utensil. The smart hood apparatus may further send instructions for presenting the occupancy information associated with the cooking utensil and the thermal state of the accessory.

Certain technical challenges exist for real-time occupancy detection and temperature monitoring of cooking utensils. One technical challenge may include accurate occupancy detection. The solution presented by the embodiments disclosed herein to address this challenge may be analysis of thermal data and RGB camera data as useful information may be extracted from the such data, which may more effectively procure the information and be transferred across the thermal and RGB realms using a homography to detect occupancy. Another technical challenge may include effective handle detection for monitoring its temperature. One solution presented by the embodiments disclosed herein to address this challenge may be generating Hough circle transform for an image of a cooking utensil, applying a Canny edge detector on the image to generate an edged image, looping through contours and finding the intersection based on the Hough circle transform and the edged image, and determining the handle coordinates as reflected since these steps effectively isolate the handle from the main body of the cooking utensil. Another solution may be an evolutionary algorithm based on the temperature value of the pixels in the thermal image of the cooking utensil as the evolutionary algorithm may search for hot thermal image pixels attached to the outline of the cooking utensil and then attempt to build a shape outwards with like-temperature pixels until a closed shape is formed, corresponding to a handle. Another technical challenge may include effective classification of food doneness. The solution presented by the embodiments disclosed herein to address this challenge may be an image classification model based on a convolutional neural network (CNN) as the output layer of the CNN may be the prediction vector that gives two classes including cooked and raw, with corresponding confidence levels.

Certain embodiments disclosed herein may provide one or more technical advantages. A technical advantage of the embodiments may include improved overall cooking experience and safety for the user as the smart hood apparatus may leverage sensor fusion, computer vision and sensor related technologies to make informed decisions for real-time occupancy detection and temperature monitoring of cooking utensils. Certain embodiments disclosed herein may provide none, some, or all of the above technical advantages. One or more other technical advantages may be readily apparent to one skilled in the art in view of the figures, descriptions, and claims of the present disclosure.

Studies show that leisure time is getting increasingly squeezed by the modern lifestyle. More and more people may be attempting to multitask and do many chores and household activities at once. Oftentimes when cooking, people may try to do multiple things at once to save time. Cooking may require almost constant attention from a user for simple tasks that may potentially be automated. In an ideal case, the user may only have to check on the food items on the cooktop/stovetop at critical stages in the cooking process, freeing their time to do other things. This may be not possible with a traditional cooktop/stovetop setup. A common, yet potentially dangerous, mishap in the kitchen may be forgetting to turn off a burner after cooking. US fire departments responded to an estimated average of 172,900 home structure fires per year started by cooking activities in 2014-2018. An added risk with gas stoves may be leakage of carbon monoxide and/or natural gas if the burner is left on with no flame. This may be extremely dangerous, and even more so for elderly people whose sense of smell may not be able to detect the natural gas. Other simple, yet frustrating mistakes that may cost the user time may include accidently turning on the wrong burner or placing their cooking utensil in an uncentered position of the burner without noticing. In another scenario, sometimes a pot of food may be left on the cooktop/stovetop to cool off slightly before being placed in the fridge. However, oftentimes the user may forget about the pot and the food may go bad if left out for too long. For food temperature regulation, it may be recommended to pre-heat a cooking utensil to a given temperature range based on its material before placing the cooking ingredients in it. Most cooking guides may recommend employing empirical methods such as throwing a drop of water on the surface or placing one's hand just above the surface. This may be difficult to master and may be subject to human error. Furthermore, heating the cooking utensil too much may risk release of toxic fumes which are harmful to humans. Another byproduct of heating the cooking utensil may be that the handle may get extremely hot to the point of burning the user without any visual warning. Furthermore, cooking may be a non-trivial task, which may take years to become fully proficient in. There may be many preparation steps, order of operations to follow and finishes to achieve that oftentimes require a hardened intuition to gauge. Many times, a user may forget the exact timing required to leave an item to boil. For instance, to hard-boil an egg it should be left in for a specified amount of time. An example of achieving a specific finish may be seen when cooking a steak. Several options exist such as rare, medium rare, medium well, etc. Even to a well-trained eye it may be difficult to get the exact desired finish. A product addressing all the aforementioned issues related to cooking in a manner that can be actuated on by either a kitchen robot assistant, a smart cooktop/stovetop, or a human may increase the versatility of the product, allowing it to reach as many households as possible.

In particular embodiments, the smart hood apparatus disclosed herein may effectively address the aforementioned issues related to cooking. The smart hood apparatus may be integrated in a kitchen hood in the kitchen environment and positioned over the cooktop. The smart hood apparatus may be implemented as a universal, low-cost range hood upgrade that may improve the cooking experience for any kitchen design with the considerations of aesthetics, technological compatibility with other appliances and cost. Regarding aesthetics, the smart hood apparatus may be easily attached to existing stoves and range hoods. There may be no need to substitute a user's stove or range hood that already matches the style of the kitchen. The casing of the smart hood apparatus may be customized to match common kitchen appliance finishes. Furthermore, the embodiments disclosed herein may eliminate the need for other bulkier and awkward looking devices like instant pots or large kettles, which may reduce clutter on the cooktop/stovetop and thus improve the kitchen aesthetic. Regarding technological compatibility, the versatility of the smart hood apparatus may allow it to be seamlessly plugged in to a smart kitchen environment or conversely it may also operate in a traditional, non-smart kitchen atmosphere. Regarding cost, the smart hood apparatus may be designed to be a low-cost product using a host of easy-to-acquire sensor technologies. In addition, by removing the necessity of other cooking devices like instant pots, this may save cost in the context of the overall kitchen.

FIG. 1 illustrates an example architecture 100 of a smart hood apparatus. In particular embodiments, the smart hood apparatus may comprise one or more sensors 110. The one or more sensors 110 may comprise one or more of a thermal sensor 110a, an RGB camera 110b, an audio sensor 110c, a depth sensor 110d, or an air particle sensor 110e. As an example and not by way of limitation, the thermal sensor 110a may comprise one or more of a resistive bolometer based thermal detection imaging camera, a pyroelectric based thermal detection imaging camera, an infrared thermometer sensor, or a temperature probe. As another example and not by way of limitation, the RGB camera 110b may comprise one or more of a CCD (charge-coupled device) sensor camera or a CMOS (complementary metal oxide semiconductor) sensor camera. As another example and not by way of limitation, the audio sensor 110c may comprise one or more of a cardioid microphone, an omnidirectional microphone, or a shotgun microphone. As another example and not by way of limitation, the depth sensor 110d may comprise one or more of an ultrasonic sensor, a ToF (time of flight) camera, a Lidar, a radar, or a stereo camera.

In particular embodiments, the sensors 110 may be linked to the mechanical/hardware components 120 via linking hardware 130 (e.g., screws plus nuts, interference fit, etc.) The purpose of the mechanical/hardware components 120 may be to attach the sensor brigade to a mounting apparatus on the smart hood. In particular embodiments, the mechanical/hardware components 120 may comprise a mechanical housing 122 and a range hood mount 124. As an example and not by way of limitation, the mechanical housing 122 may be comprise one or more of an aluminum case or a stainless steel case. As another example and not by way of limitation, the range hood mount 124 may comprise a rectangular mounting magnet, or screws plus bracket.

In particular embodiments, the controller unit 140 may use the raw sensor data 150 as input and via algorithmic analysis it may output actionable events 160 and/or prompts 170 to the event actuation hardware 180 or for human intervention 190. As an example and not by way of limitation, the controller unit 140 may comprise one or more of an embedded system, a personal computer (PC), or a small form factor mini PC. As another example and not by way of limitation, the event actuation hardware may comprise one or more of a robot kitchen assistant, or a smart cooktop/stovetop.

Figure 2:
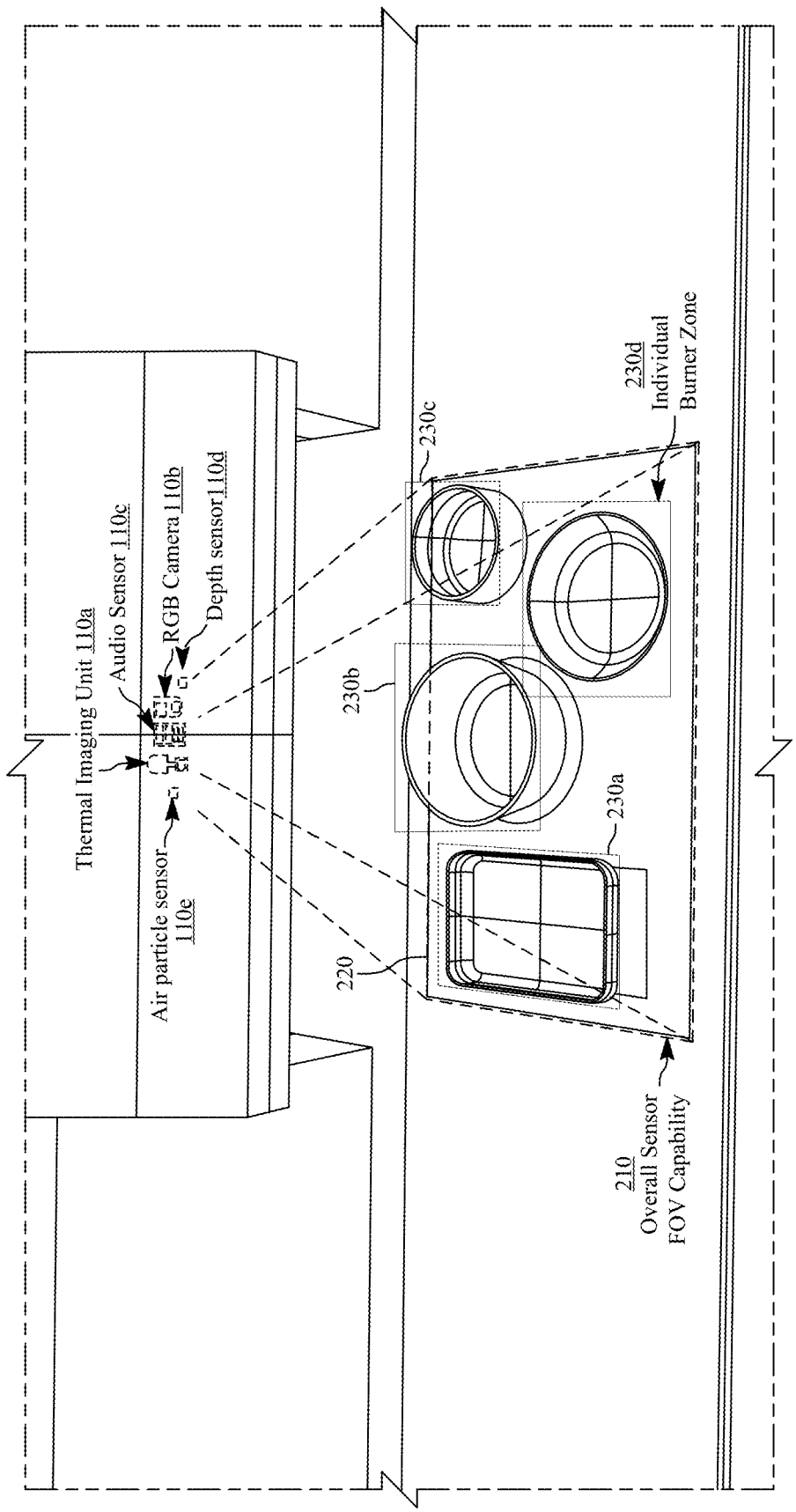
FIG. 2 illustrates an example configuration for identifying burner zones based on sensor data.

FIG. 2 illustrates an example configuration for identifying burner zones based on sensor data. The embodiment descriptions may focus on the algorithmic approach for a single utensil/burner on the cooktop/stovetop for simplicity. However, the embodiments disclosed herein may cover any arbitrary layout of burners/utensil locations on a cooktop/stovetop. In particular embodiments, the smart hood apparatus may identify the burner zones using a machine-learning model trained on a variety of cooktops/stovetops. The smart hood apparatus may run the machine-learning model independently on each burner zone by masking the sensor data appropriately. As demonstrated in FIG. 2, the sensors 110 including the thermal imaging unit 110a, the RGB camera 110b, and the depth sensor 110d may have an overall sensor field-of-view (FOV) capability 210 with respect to the cooktop/stovetop 220. The sensors 110 may additionally include the audio sensor 110c or an air particle sensor 110e. The individual burner zone 230a-d may be within the overall sensor FOV capability 210. In terms of the primary sensors 110 shown in FIG. 2, the smart hood apparatus may leverage sensor fusion technologies to make use of all the sensors 110. In particular embodiments, the smart hood apparatus may also opt out of the sensor fusion approach and operate with any lesser combination of sensors 110.

In particular embodiments, the smart hood apparatus may achieve occupancy detection via analysis of thermal data and RGB camera data. Occupancy detection may encompass all items related to the presence or lack-thereof of cooking utensils on the cooktop/stovetop, state of burners and the relation between the burners and the cooking utensils/accessories. In particular embodiments, the one or more parameters of the cooking utensil may comprise one or more of a material of the cooking utensil, a position of the cooking utensil on the cooktop, a temperature of the cooking utensil, a size of the cooking utensil, a volume of the cooking utensil, an area of the cooking utensil occupying the cooktop, a depth of the cooking utensil, a depth of food items in the cooking utensil, a type of the cooking material in the cooking utensil, a decibel level associated with the cooking utensil, or a presence of a lid associated with the cooking utensil. Useful information may be extracted from the sensors 110 that may more effectively procure the information and be transferred across the thermal and RGB realms using a homography. As an example and not by way of limitation, the burner locations may be identified primarily using the RGB camera, and the equivalent location in the thermal camera may be calculated via the homography transformation. Analysis of thermal data and RGB camera data may be an effective solution for addressing the technical challenge of accurate occupancy detection as useful information may be extracted from the such data, which may more effectively procure the information and be transferred across the thermal and RGB realms using a homography to detect occupancy.

In particular embodiments, the occupancy information may indicate one or more of whether the cooking utensil is correctly placed on one of a plurality of burners of the cooktop, whether one of the plurality of burners occupied by the cooking utensil is turned on, whether one or more of the plurality of burners not occupied by the cooking utensil are turned on (i.e., the wrong burner was turned on), whether a temperature of the cooking utensil is below a threshold temperature (e.g., the user forgot to turn off a burner or the cooking utensil has cooled off sufficiently to be stored), or whether the cooking utensil is being unevenly heated by the one of the plurality of burners occupied by the cooking utensil (for which the smart hood apparatus may proactively correct for uneven heating within the cooking utensil). The aforementioned occupancy information may be determined by the notion of maintaining a detailed idea of each burner's state over time. If a burner has remained hot for an extended period of time with no cooking utensil on it, one may logically come to the conclusion that it was forgotten on. In particular embodiments, the smart hood apparatus may generate useful prompts that may be acted on in correspondence to the aforementioned incidents. For example, if the burner was forgotten on, the smart hood apparatus may either actuate a smart knob to turn it off or give a prompt via a smartphone application or an audio speaker for the user to return and turn off the burner. This may serve to eliminate many of the potential dangers and annoyances of cooking.

In particular embodiments, the occupancy detection may comprise a calibration phase and an active monitoring phase. The calibration phase may entail establishing the cooktop/stovetop burner layout and creating the appropriate zones for each burner location. This may be done using a combination of edge detection, Hough circle transforms and polygon shape detection. Once the zones are established, this may allow for a detailed state machine to take over and track all the sub-features encompassed by occupancy detection.

Figure 3:
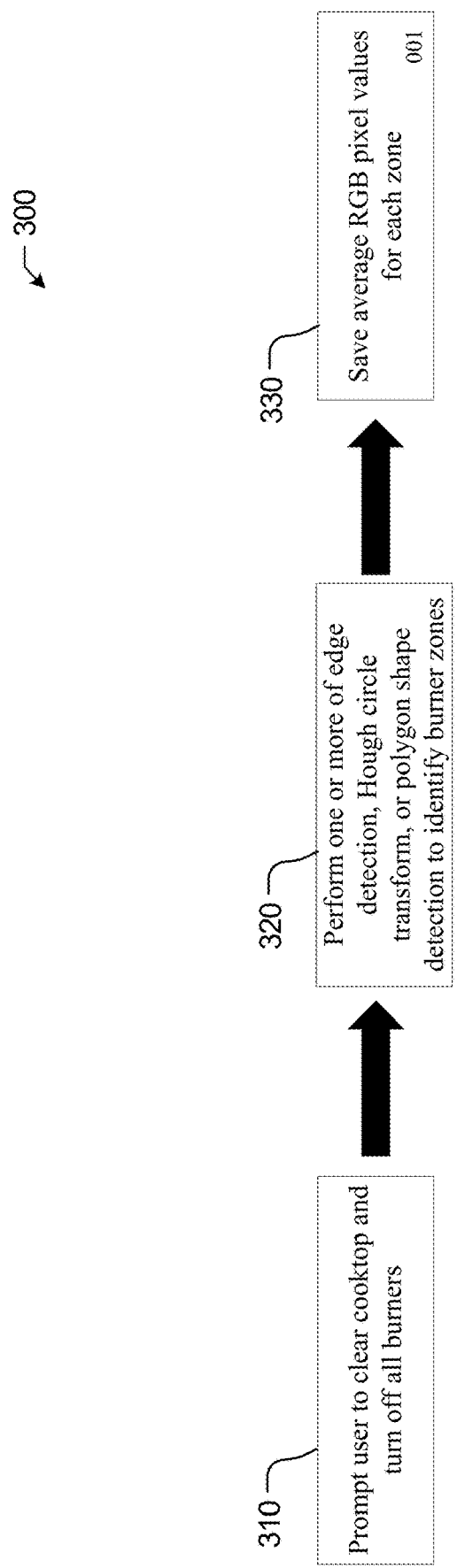
FIG. 3 illustrates an example process for calibration.

FIG. 3 illustrates an example process 300 for calibration. At step 310, the smart hood apparatus may prompt a user to clear cooktop/stovetop and turn off all burners. At step 320, the smart hood apparatus may perform one or more of edge detection, Hough circle transform, or polygon shape detection to identify burner zones. As an example and not by way of limitation, most burner shapes may be circular in nature, lending itself nicely to methods based on Hough circle transform which may be configured to search for circles in the image within a certain size and adjacency boundary. By using standard burner sizes and distances between their centers, this may create a filter to search for burner outlines. As another example and not by way of limitation, typical Canny edge detection may be used on the RGB camera data. Canny edge detection may comprise noise reduction using a Gaussian filter, finding the intensity gradient of the image (which gives the edge gradient and direction for each pixel), removing unwanted pixels using non-maximum suppression, and finally hysteresis thresholding to filter out weak edge candidates. This information may be used directly to search for other common burner shapes like squares, rectangles, or conversely it may be fed into algorithms that search for contours and their respective shapes they form a boundary around. This zone information may be also translated to the thermal realm using a homography. At step 330, once each zone has been identified, the smart hood apparatus may save the average RGB pixel values for each zone. To be more specific, the smart hood apparatus may average the RGB pixel values contained in the zone to establish a mark for each empty burner. To allow for various shapes and sizes of cooking utensils, each identified zone may be given a slightly larger rectangle to cover a larger area. The averaging process may be done over all the span of several seconds for greater accuracy, for instance 5 seconds.

Figure 4:
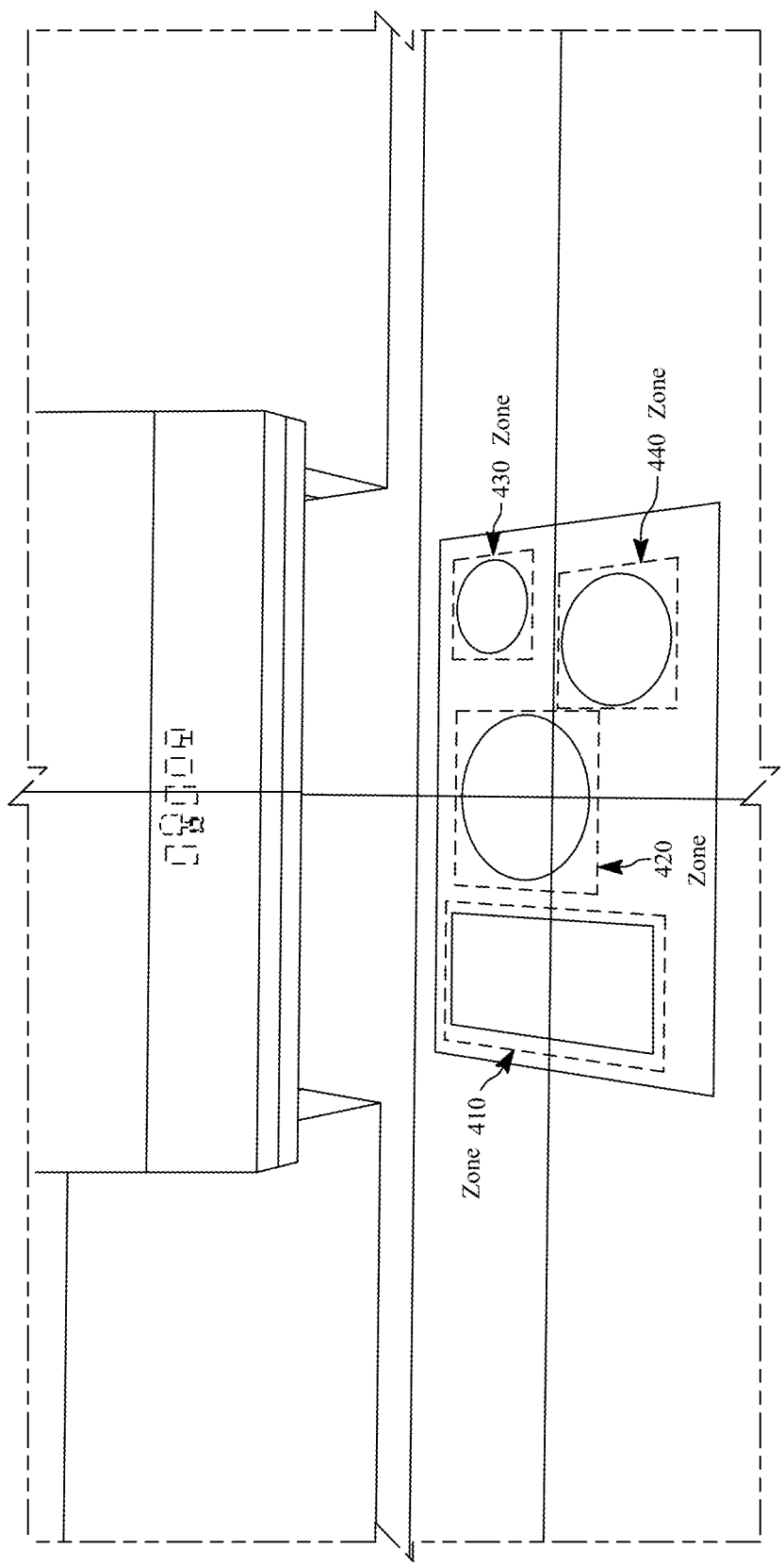
FIG. 4 illustrates an example cooktop with detected burner zones.

FIG. 4 illustrates an example cooktop with detected burner zones. As illustrated in FIG. 4, the detected burner zones may comprise zone 410, zone 420, zone 430, and zone 440. Besides the methods described associated with step 320 in FIG. 3, identifying burner zones may alternatively be done using a machine-learning model trained on a variety of different cooktop/stovetop arrangements. Such machine-learning model may increase the versatility and deal with more difficult scenarios where the burner zones are more difficult to spot or do not have distinct markings. The machine-learning model may return the contours of the identified burner locations.

Figure 5:
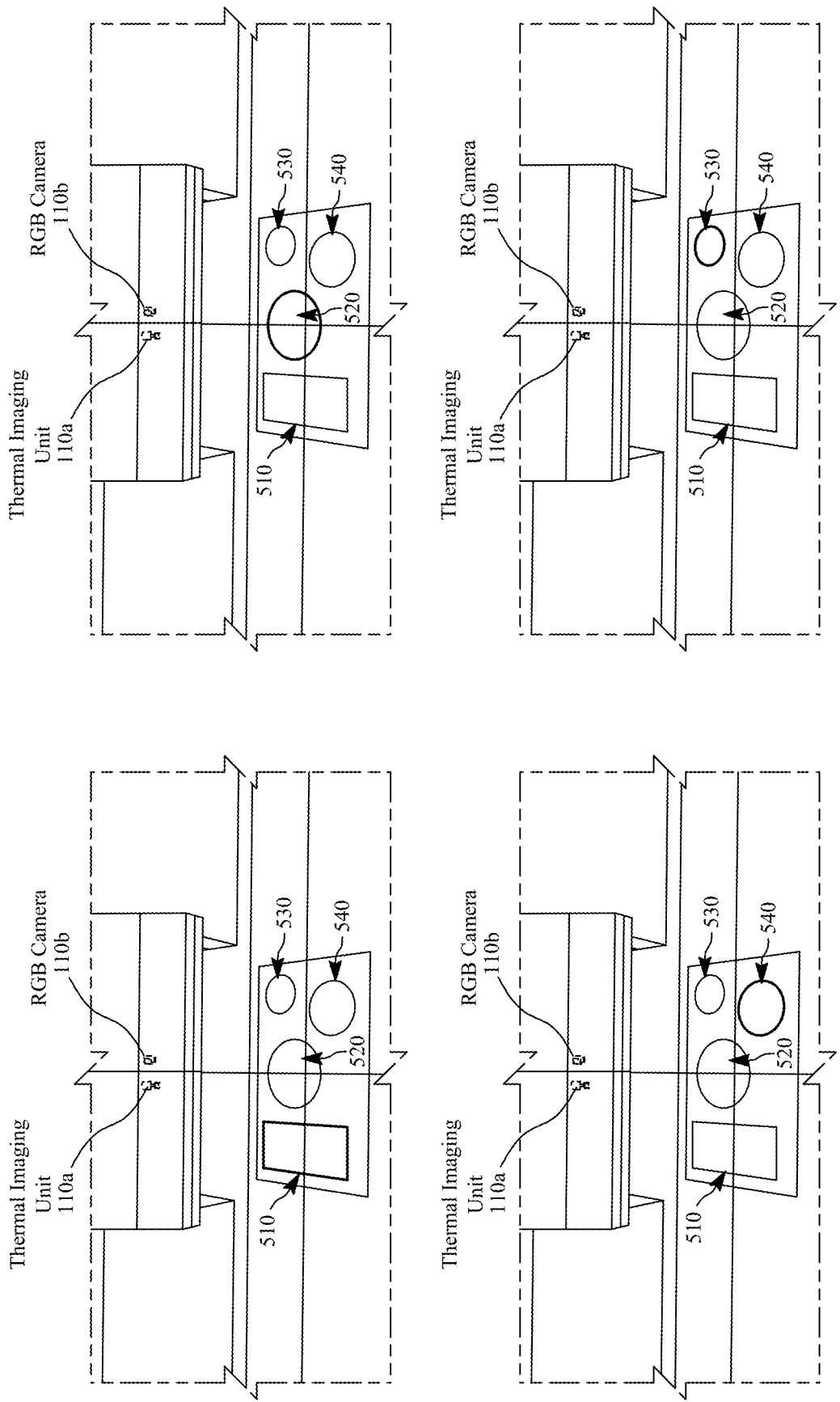
FIG. 5 illustrates an example setup for identifying burner zones using thermal camera.

FIG. 5 illustrates an example setup for identifying burner zones using thermal camera. In particular embodiments, another method of identifying burner zones on a cooktop/stovetop for the calibration phase may be using a thermal camera based interactive calibration process with the user. The principle may revolve around the user turning on one burner at a time to allow the thermal camera to scan the cooktop/stovetop and identify the hot region. As an example and not by way of limitation, the user may need to turn on burner 510, burner 520, burner 530, and burner 540 one at a time.

Figure 6:
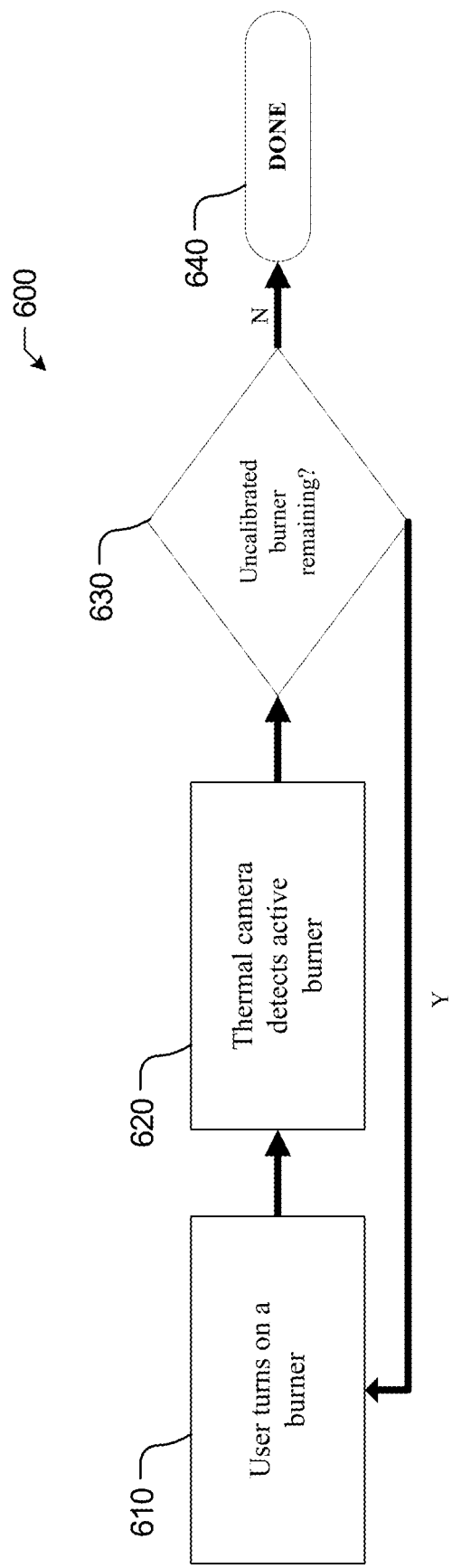
FIG. 6 illustrates an example flow diagram of thermal calibration.

FIG. 6 illustrates an example flow diagram 600 of thermal calibration. In particular embodiments, the thermal calibration routine illustrated in the flow diagram 600 may be suitable for any arbitrary cooktop/stovetop and burner layout. The calibration process may utilize a notification medium to guide the user through the process, e.g., via a user interface associated with the smart hood apparatus, a smartphone application, or audial cues. The smart apparatus may instruct the user to turn on one burner at a time. As illustrated in FIG. 6, at step 610, the user may turn on a burner. At step 620, the thermal camera 110a may detect active burner. To be more specific, for each burner, the thermal camera 110a may identify the hot zone corresponding to the burner using a variety of methods. As an example and not by way of limitation, these methods may include, but not limited to, edge detection, Hough circle transform, and polygon shape detection. In particular embodiments, if a burner is not identified at the first time, the user may be prompted to re-try the burner at a higher power level, or manually specify the location on the user interface showing a model of the inferred cooktop/stovetop. Once the burner zone is detected successfully, the location information may be translated into the RGB realm using the homography and the user maybe notified. At step 630, the smart hood apparatus may determine if there is any uncalibrated burner remaining. If yes, the user may be then prompted to continue this process for each uncalibrated burner remaining on their cooktop/stovetop, repeating from step 610 to step 630. If there is no uncalibrated burner remaining, the calibration is done at step 640. The calibration routine illustrated in FIG. 6 may be robust and versatile, allowing it to work on any suitable cooktop/stovetop that may otherwise lack visual features to distinguish between burners.

Figure 7:
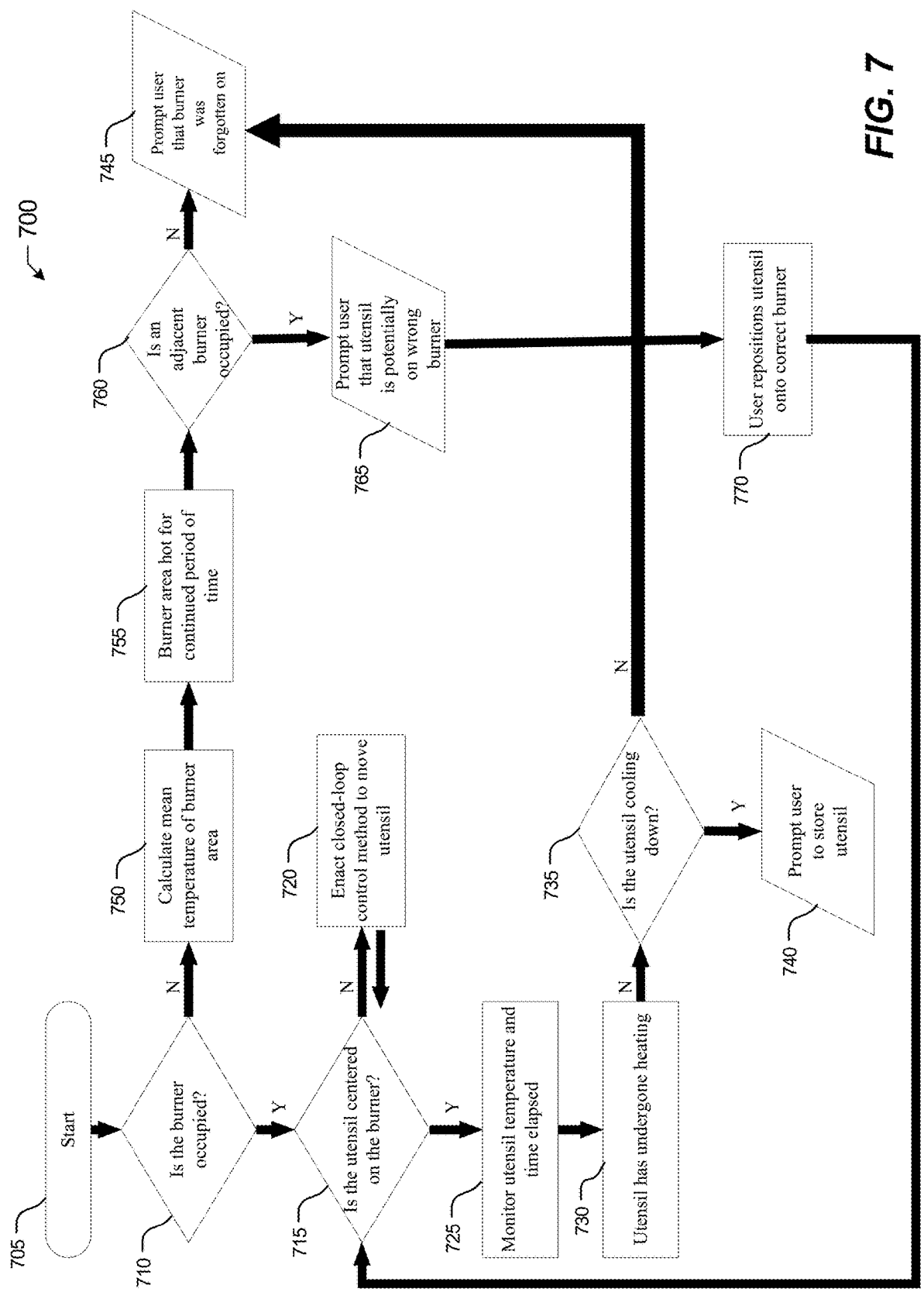
FIG. 7 illustrates an example flow diagram

FIG. 7 illustrates an example flow diagram 700 for active monitoring. Once the calibration phase is complete, this may signal the start 705 of the active monitoring phase. This may involve creating a state machine that tracks the status of each burner zone established which continually checks for the key events like a burner being left on, wrong burner turned on, etc. The flow diagram 700 illustrates all these possible events and the detection process for each one. At step 710, the smart hood apparatus may determine if the burner is occupied.

Figure 8:
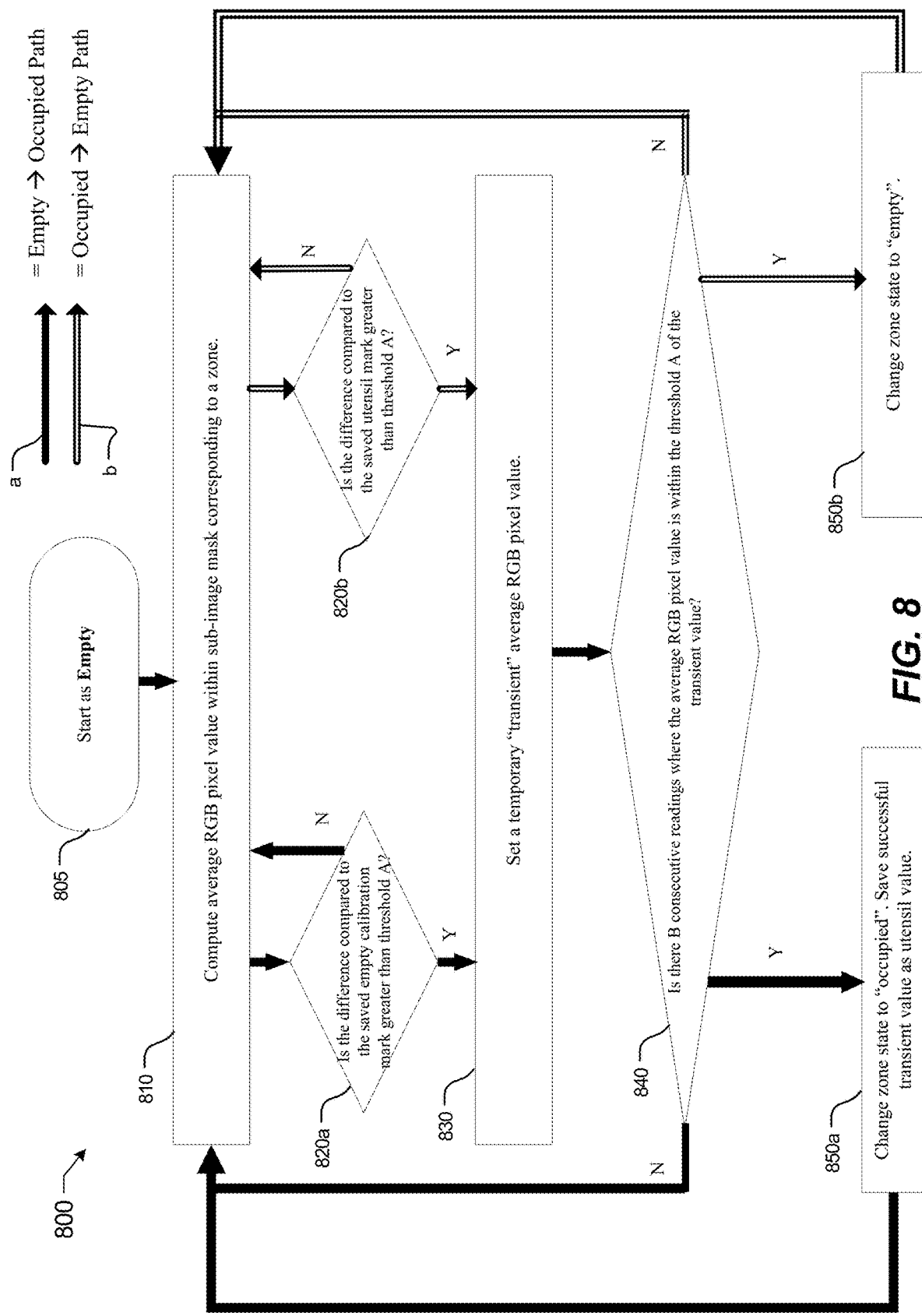
FIG. 8 illustrates an example flow diagram for determining burner occupancy. for active monitoring.

FIG. 8 illustrates an example flow diagram 800 for determining burner occupancy. The process illustrated may be for an individual burner zone, but the process may be parallelized across all zones. There may be two separate paths. One path may be "Empty→Occupied Path" a indicating the detection from empty to occupancy by a cooking utensil. The other path may be "Occupied→Empty Path" b indicating changing the detection from being occupied to empty, e.g., the cooking utensil being removed by a user. For each burner zone, it may start as empty at the first step 805. In order to determine if a given zone is occupied by a cooking utensil or not, a simple concept of comparing the current RGB pixel values against the saved RGB mark corresponding to the empty burner may be utilized. Therefore, the smart hood apparatus may compare average RGB pixel value within sub-image mask corresponding to a zone at step 810. Filtering may be required to avoid false positives when a transient event such as a hand moving across a burner occurs. The threshold, A, and number of consecutive readings, B, may be used for this purpose. A may be chosen such that small lighting changes may not trigger an occupancy and depend on the pixel format of the RGB camera. B may be chosen to filter out transient events and depend on the frame rate of the RGB camera.

Regarding path a, after step 810 and at step 820a, the smart hood apparatus may determine if the difference compared to the saved empty calibration mark is greater than the threshold A. If no, the process may return to step 810 and repeat step 810. If yes, the process may proceed to step 830, where the smart hood apparatus may set a temporary "transient" average RGB pixel value. At step 840, the smart hood apparatus may determine if there is B consecutive readings where the average RGB pixel value is within the threshold A of the transient value. If no, the process may return to step

810 and repeat step 810. If yes, the process may proceed to step 850*a*, where the smart hood apparatus may change zone state to "occupied" and save successful transient value as utensil value. After step 850*a*, the process may return to step 810.

Regarding path b, after step 810 and at step 820*b*, the smart hood apparatus may determine if the difference compared to the saved utensil mark is greater than the threshold A. If no, the process may return to step 810 and repeat step 810. If yes, the process may proceed to step 830, where the smart hood apparatus may set a temporary "transient" average RGB pixel value. At step 840, the smart hood apparatus may determine if there is B consecutive readings where the average RGB pixel value is within the threshold A of the transient value. If no, the process may return to step 810 and repeat step 810. If yes, the process may proceed to step 850*b*, where the smart hood apparatus may change zone state to "empty". After step 850*b*, the process may return to step 810.

Figure 9A:
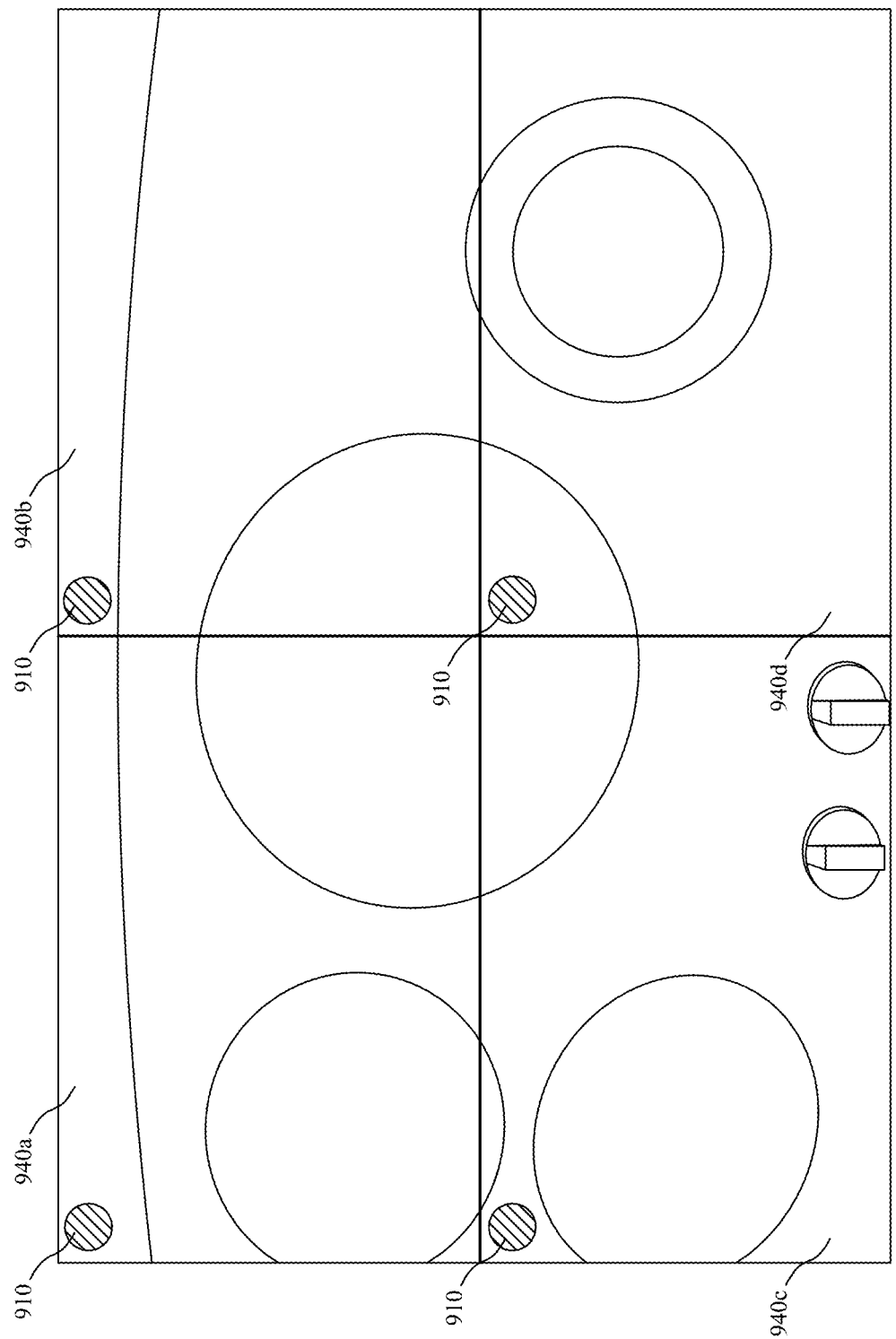
FIGS. 9A-9C illustrate an example implementation of the flow diagram in FIG. 8.
Figure 9B:
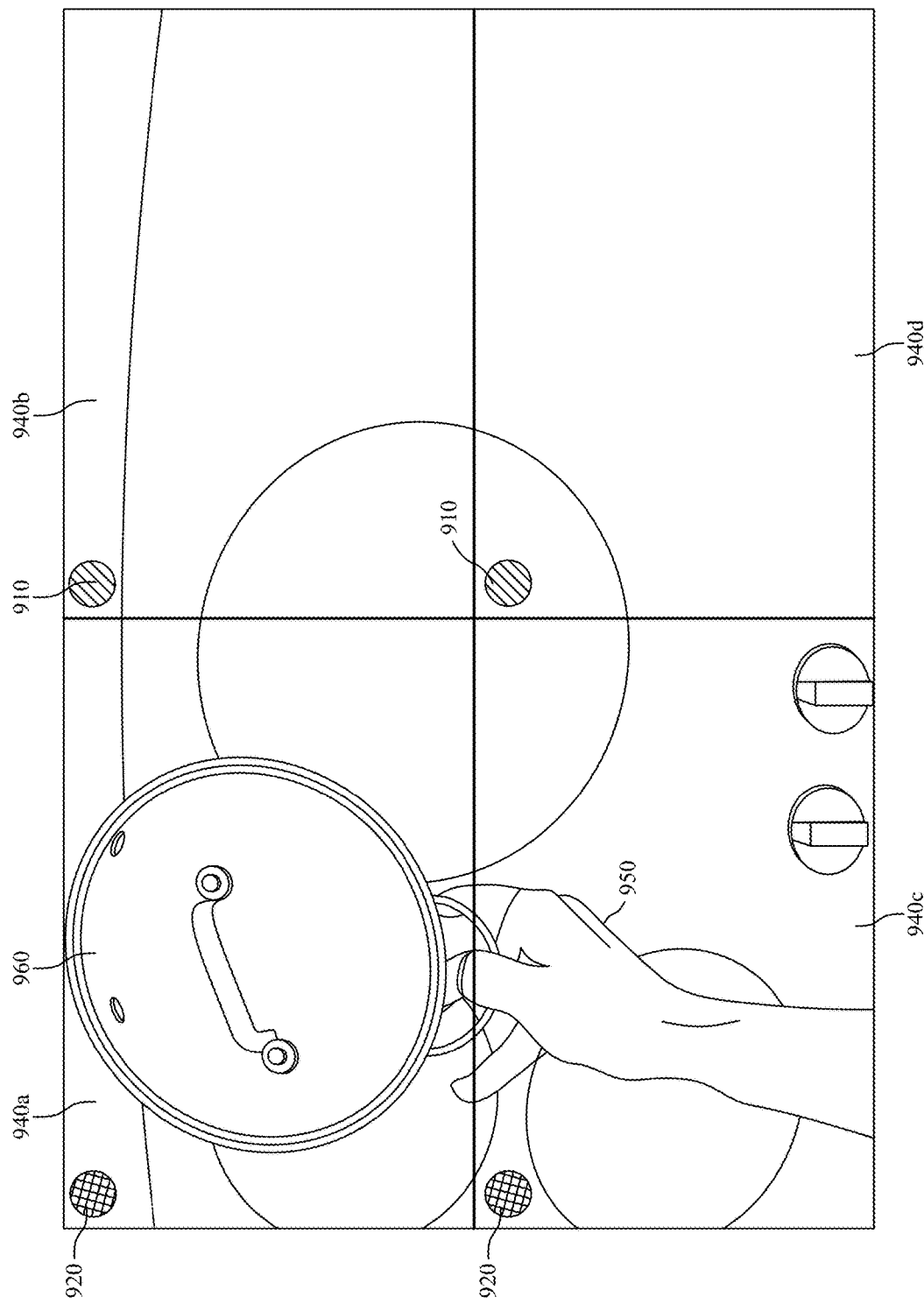
Figure 9C:
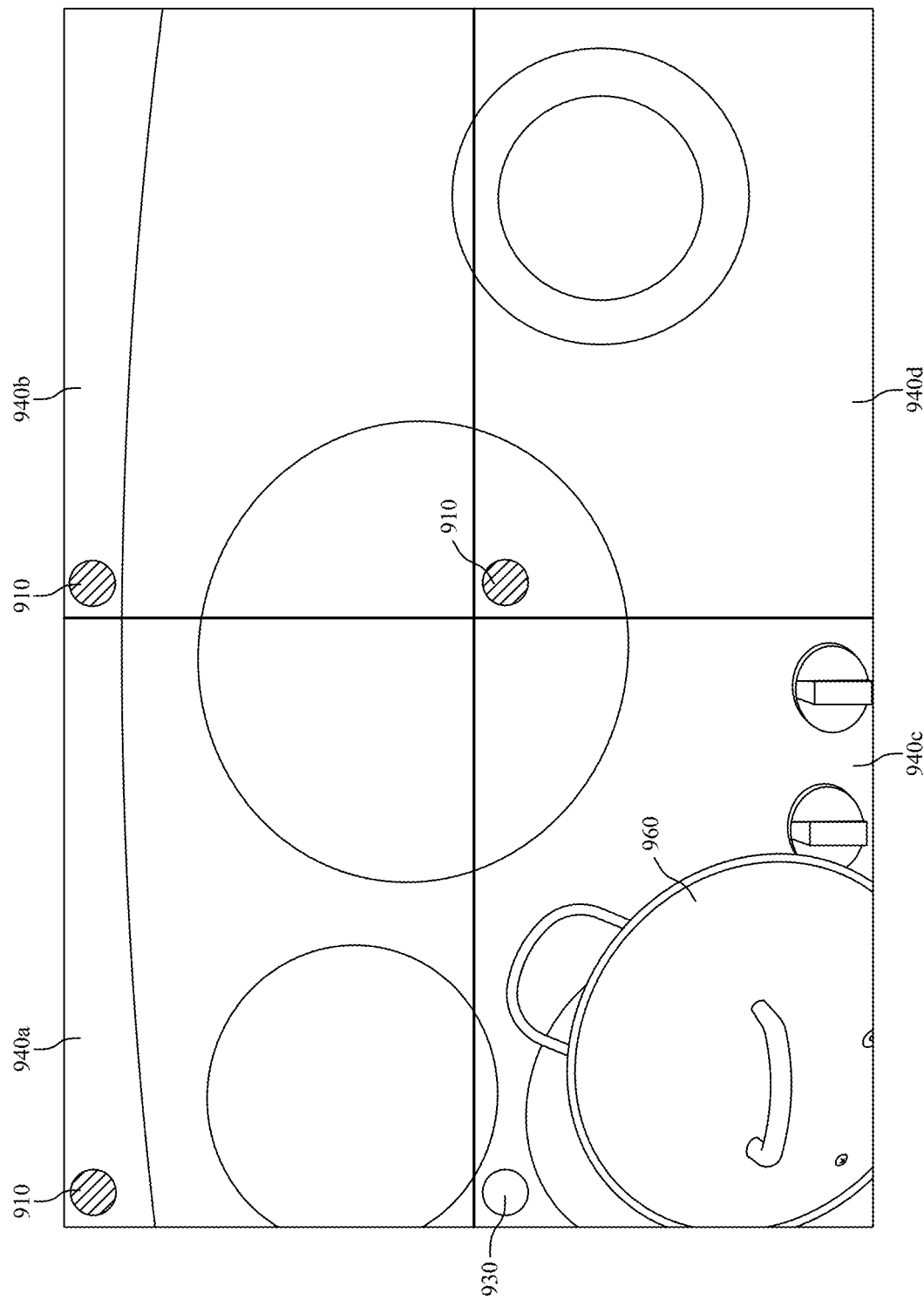

FIGS. 9A-9C illustrate an example implementation of the flow diagram 800 in FIG. 8. The view from the RGB camera 110*b* is split into 4 zones corresponding to the 4 quadrants of the view for simplicity (in reality, these zones may correspond exactly to the burner areas). The circle stationed in the top left corner of each zone represents the state of the quadrant. Indicator 910 indicates the corresponding burner zone is empty, indicator 920 indicates the corresponding burner zone is transient, and indicator 930 indicates the corresponding burner zone is occupied. FIG. 9A illustrates the detection of empty burners. As may be seen, all the four burner zones 940*a*-940*d* are empty. FIG. 9B illustrates the detection of a transient state. For example, a hand 950 may be moving a pot 960 across the burners. Therefore, the two burners zones 940*a*-*b* the hand 950 is above may be indicated as transient. FIG. 9C illustrates the detection of the occupancy of a burner. As may be seen, the In particular embodiments, another approach to determine if a burner is occupied may be to substitute a depth sensor reading for the average RGB pixel values. It may be expected that the depth value may be uniform across the cooktop/stovetop and therefore the presence of any cooking utensil may decrease the depth reading for a given burner zone. This may slightly reduce the complexity of the algorithmic approach at the expense of complicating the hardware setup.

Back to the flow diagram 700 in FIG. 7, if the burner is occupied, the process may proceed to step 715, where the smart hood apparatus may determine if the pot is centered on the burner. If no, the smart hood apparatus may enact closed-loop control method to move the utensil at step 720. After step 720, the process may return to step 715 and repeat it. As may be seen, step 715 and step 720 focus on centering the cooking utensil on the burner (to within a reasonable level of error, e.g., 2 cm). This may be achieved by creating a de-facto closed-loop control system using the RGB camera data as the input and the user as the actuating force to change the output. By knowing the precise burner location from the calibration process, the center of the zone may be known in terms of its pixel location in the RGB image. Once the cooking utensil is placed on the stove, the utensil outline may be detected using either a Hough circle transform or a machine-learning model trained on a variety of utensil types. The center of the utensil outline may hence also be known in terms of its pixel location, which may then be compared against the center of the calibrated burner location.

Figure 10:
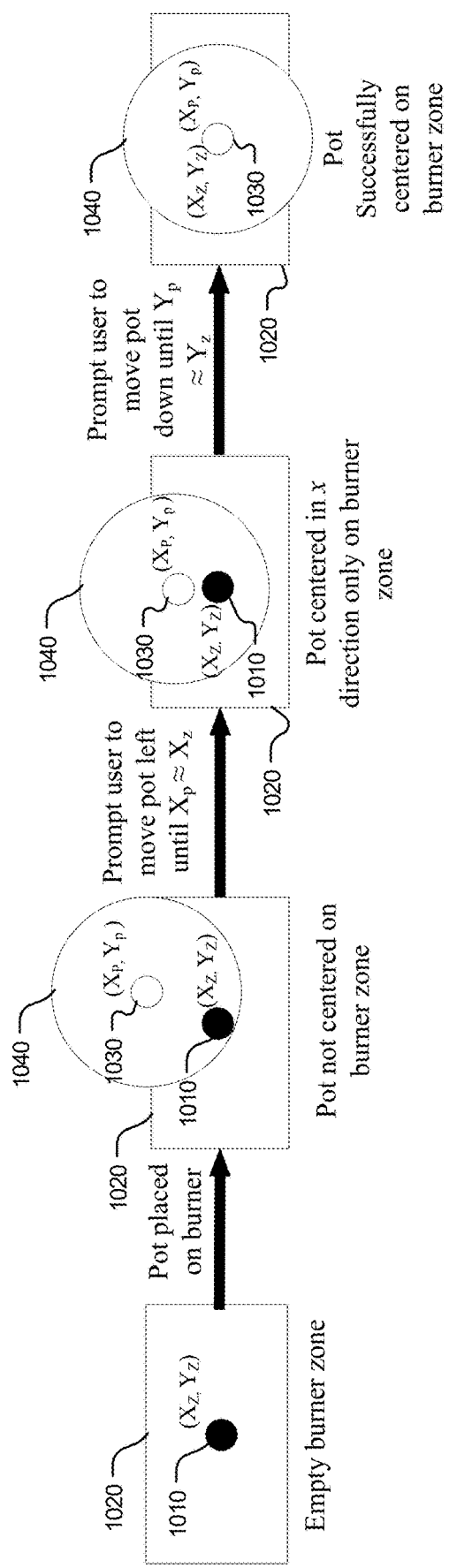
FIG. 10 illustrates an example centering of a pot on a burner.

FIG. 10 illustrates an example centering of a pot on a burner. In FIG. 10, $(X_Z, Y_Z)$ 1010 may represent the center of the burner zone 1020 and $(X_P, Y_P)$ 1030 may represent the center of the pot outline 1040, respectively (in terms of pixel location). In particular embodiments, the center 1010 may be the target location on the cooktop/stovetop. Various prompts may be given to the user via a user interface or audial commands from a speaker associated with the smart hood apparatus. In particular embodiments, after a pot is placed on the empty burner zone 1020, the smart hood apparatus may determine that the pot is not centered on the burner zone 1020. Accordingly, the smart hood apparatus may prompt the user to move the pot left until $X_p \approx X_z$. The smart hood apparatus may then determine that the pot is centered in x direction only on the burner zone 1020. Accordingly, the smart hood apparatus may prompt the user to move the pot down until $Y_p \approx Y_z$. Finally, the smart hood apparatus may determine that the pot is successfully centered on the burner zone 1020. As may be seen for this example, the allowable deviation from the target location may be zero along both axes. However, the allowable deviation may be any suitable distance from the target location that may be predetermined according to different embodiments. For example, the allowable deviation may be +/−1 cm from either x axis or y axis.

Figure 11:
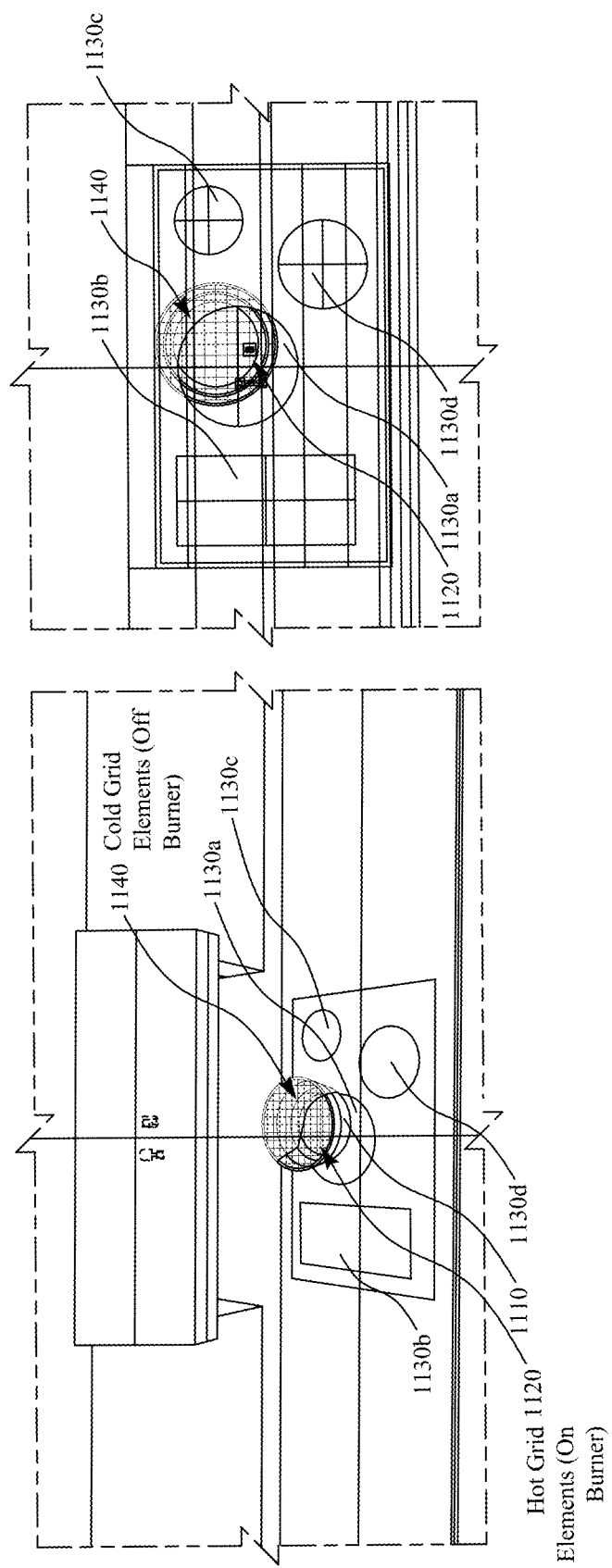
FIG. 11 illustrates an example grid system for centering a cooking utensil.

In alternative embodiments, centering the cooking utensil on the burner may comprise creating a grid within the utensil mask in the view of the thermal camera and monitoring the unit squares in the grid for uneven distribution of heat. FIG. 11 illustrates an example grid system for centering a cooking utensil. In FIG. 11, the grid system is overlayed on top of the cooking utensil 1110. As may be seen, the hot grid elements 1120 indicate the corresponding part of the pot 1110 is on a burner 1130*a*. The cold grid elements 1140 indicate the corresponding part of the pot 1110 is off the burner 1130*a* or any other burner 1130*b*-1130*d*.

Figure 12:
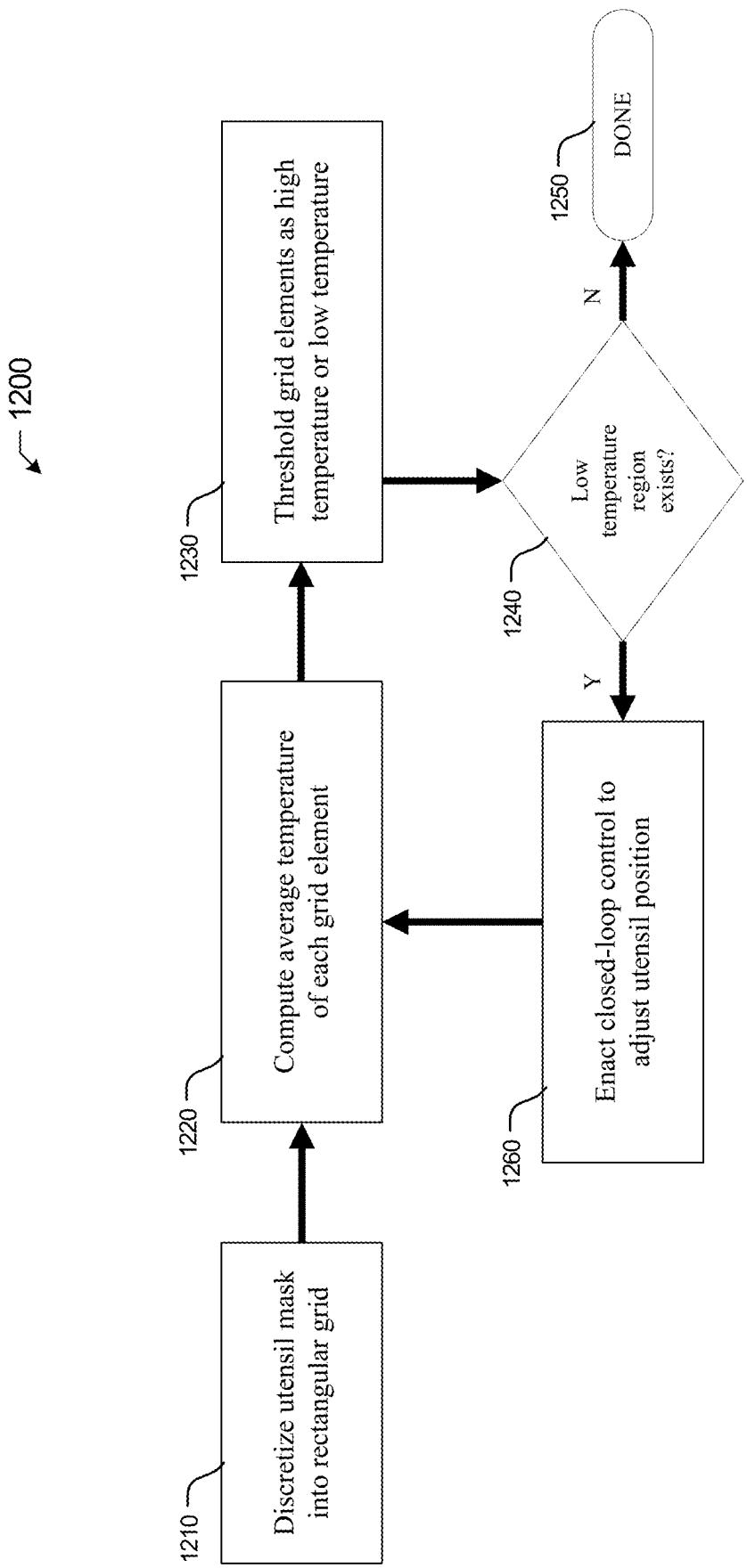
FIG. 12 illustrates an example flow diagram for using the grid system to detect uncentered cooking utensils.

FIG. 12 illustrates an example flow diagram 1200 for using the grid system to detect uncentered cooking utensils. In particular embodiments, the detection may be along with the closed-loop control method used to correct the positioning of the cooking utensil. At step 1210, the smart hood apparatus may discretize the utensil mask into rectangular grid. The utensil mask may be usually circular in nature, but the rectangle that encompasses the circle may be used as a reference point for creating the grid. Given the desired step size of the grid (e.g., 3 pixels), the length and width of the encompassing rectangle may be divided by the step size to generate the grid element locations. At step 1220, the smart hood apparatus may compute the average temperature of each grid element. For each grid element, the average value of the contained thermal image pixels may be used to create a grid of temperature values within the utensil mask. At step 1230, the smart hood apparatus may threshold the grid elements as high temperature or low temperature. Having the grid element temperature values, a binary threshold temperature may be used to split the grid elements into either a hot or cold category (in relative terms). As an example and not by way of limitation, a way of selecting the threshold temperature may be to simply use the average temperature of the entire utensil mask since there may thus be pixels guaranteed to be over and under the average value. At step 1240, the smart hood apparatus may determine if a low temperature region exists. Using either an algorithmic grid searching approach or a heuristic method of splitting the grid into larger zones and comparing average temperatures, the smart hood apparatus may determine whether there is a low temperature region present. If no low temperature region is present, this may indicate the cooking utensil is sufficiently centered on the burner, which may indicate the end of the process, i.e., "done" at step 1250. In the case that a low temperature region does indeed exist, the process may proceed to step 1260. At step 1260, the smart hood apparatus may enact a closed-loop control to adjust the utensil position to correct the error. Similar to the method shown in FIG. 10, the relative location of the cold region may dictate the nature of the instructions given to the user by a notification system. For instance, if the cold region is in the upper left corner of the utensil grid, the prompt may involve moving the utensil rightwards and downwards to correct for the error. The process may be repeated until a low temperature region no longer exists.

Back to the flow diagram 700 in FIG. 7, after determining the pot is centered on the burner, the smart hood apparatus may monitor the utensil temperature and time elapsed at step 725. At step 730, the smart hood apparatus may determine that the utensil has undergone heating. In particular embodiments, one way of calculating the temperature of the content in the utensil may be by applying a circular mask corresponding to the detected utensil circle to the thermal image data. As an example and not by way of limitation, the utensil outline may be detected using a Hough circle transform (in either the RGB or thermal realm) and translated in either direction using the homography.

Figure 13A:
FIGS. 13A-13B illustrate example detections of a pot outline.
Figure 13B:
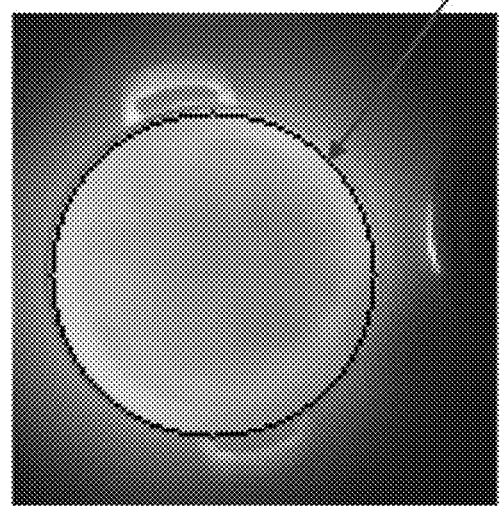

FIGS. 13A-13B illustrate example detections of a pot outline. FIG. 13A illustrates an example detection of the pot outline using RGB camera. In terms of the RGB camera, a Hough circle transform may be applied to the sensor data captured by the RGB camera to identify the circular pot region of interest, i.e., the detected pot outline 1310. Alternatively, a machine-learning model may be trained to detect pots on a cooktop/stovetop by using a collection of online images and locally obtained images as training data. The smart hood apparatus may then use such machine-learning model to detect the pot outline 1310. FIG. 13B illustrates an example detection of the pot outline using RGB thermal imaging camera. For the thermal imaging camera, a similar technique of a Hough circle transform may be used to isolate the pot circle region, i.e., the detected pot outline 1320. Again, a machine-learning model may also be trained for this purpose as well.

Figure 14:
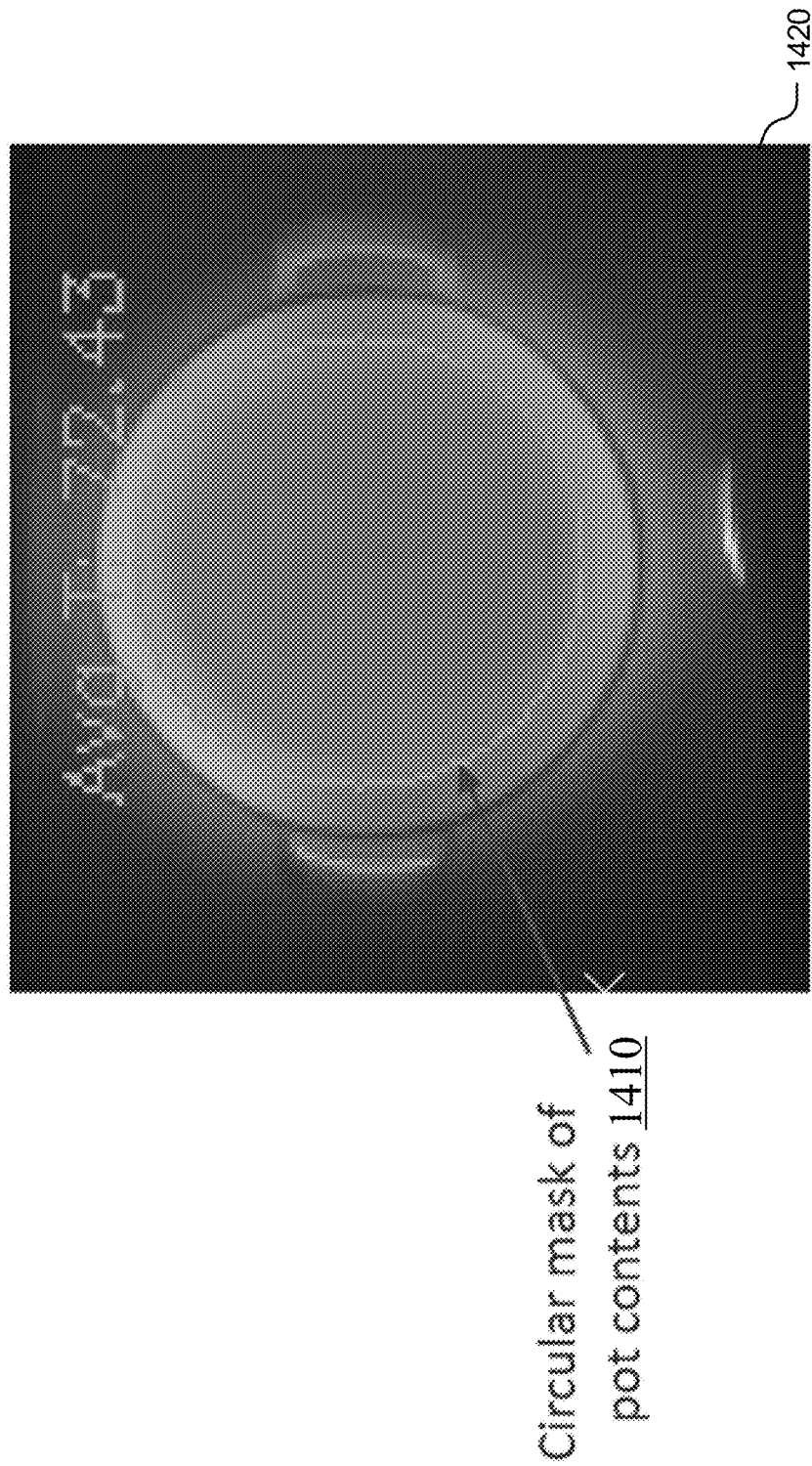
FIG. 14 illustrates an example circular mask of the pot content.

FIG. 14 illustrates an example circular mask of the pot content. In particular embodiments, one way of computing the mean temperature may be by applying a circular mask 1410 corresponding to the detected pot circle to the thermal image 1420, as demonstrated in FIG. 14. Knowing the pot outline in the thermal image 1420, the average of all the pixels contained within the pot may be taken and the sensor specific formula to convert to temperature may be applied. An alternative method to obtain the temperature of the content may be to use an infrared temperature sensor pointed into the pot, or a temperature probe placed inside the pot. For any non-contact temperature sensor, it may optionally be synchronized with the range hood fume extraction capabilities to increase reading accuracy. By tracking the average temperature over time, the state machine may determine if the cooking utensil has undergone significant heating corresponding to a cooking process.

Back to the flow diagram 700 in FIG. 7, at step 735, the smart hood apparatus may determine whether the utensil is cooling down. By continuing to track the mean temperature of the utensil content, the smart hood apparatus may determine whether the cooking utensil has cooled down after a prolonged period of heating. If the cooking utensil has indeed reached close to room temperature (e.g., within a reasonable threshold like 5° C.), this may signify the cooking content has cooled down sufficiently to then be stored in the fridge or safely be placed on the counter. Accordingly, the smart hood apparatus may prompt the user to store the utensil at step 740. As an example and not by way of limitation, the smart hood apparatus may prompt the user via an application on the user's smartphone or audial commands from the speaker of the smart hood apparatus.

On the other hand, if the cooking utensil remains hot for a prolonged period of time that exceeds the majority of cooking recipe times, this may indicate that the burner was forgotten on. Accordingly, the smart hood apparatus may prompt the user that the burner may be forgotten on at step 745. As an example and not by way of limitation, the user may be alerted of this danger via the application on the smartphone or audial commands from the speaker of the smart hood apparatus. Even in the event of outliers such as cooking an extremely time-consuming dish, the user may simply override the warning. The important aspect may be that safety critical events such as a burner potentially being forgotten on are alerted for the user as a pre-caution.

In particular embodiments, if the smart hood apparatus determine that the burner is not occupied at step 710, the process may proceed to step 750. At step 750, the smart hood apparatus may calculate the mean temperature of the burner area. As an example and not by way of limitation, a Hough circle transform may be used to create a circular mask where the mean temperature is calculated. At step 755, the smart hood apparatus may determine the burner area has been hot for a continued period of time. If the temperature is significantly above room temperature for a continued period of time, the smart hood apparatus may determine whether an adjacent burner is occupied at step 760.

If the state machine indicates that an adjacent burner is occupied by a cooking utensil that is not hot (e.g., it is close to room temperature), then it may be probable the user has turned on the wrong burner. Accordingly, the smart hood apparatus may prompt the user that the utensil is potentially on the wrong burner at step 765. As an example and not by way of limitation, the prompt may be either through a user interface, an application on the smartphone, or a speaker of the smart hood apparatus. If it was indeed the case of putting the pot/pan on the wrong burner, the user may reposition the cooking utensil onto the correct burner at step 770 and the flow diagram may continue from step 715. Alternatively, if the burner has been hot for a long time with no adjacent pots present, it may be probable that the burner was forgotten on, or the user forgot to ever place the cooking utensil on it. Subsequently, the smart hood apparatus may prompt the user that the burner was forgotten on at step 745. The user may act accordingly to rectify the situation.

In particular embodiments, the smart hood apparatus may determine the temperature of a cooking utensil. The smart hood apparatus may additionally monitor smoke during the cooking process. The smart hood apparatus may accomplish both functions using a mixture of thermal data, RGB camera data, depth sensor data, and air particle sensor data. As an example and not by way of limitation, the smart hood apparatus may warn the user of any hot handles on a pot or pan. Knowledge from the RGB image of the cooking utensil may be combined with the thermal data to segment the appropriate areas of the pot/pan. This may help the user avoid a potentially painful situation. As another example and not by way of limitation, the thermal data may also be used in conjunction with the air particle sensor to detect any smoking. Even if some smoking is expected, it may be still useful to notify the user of both the sole presence of smoke along with the intensity. This may be helpful as a safety precaution or in the case that the level of smoke is unexpected for a given cooking process.

In particular embodiments, scientific and cooking guidelines may be combined to establish the appropriate temperature range for a cooking utensil based on its material. These dynamic factors measured in real-time by the sensors along with the static information of material and recommended temperatures may allow a monitoring system associated with the smart hood apparatus to carefully track the temperature of the accessory of the cooking utensil and the food items in the cooking utensil to ensure an optimal experience for the user. The correct pre-heating temperature may act as a prompt to begin cooking and a temperature approaching dangerous levels may act as an indicator to turn down the heat.

Figure 15:
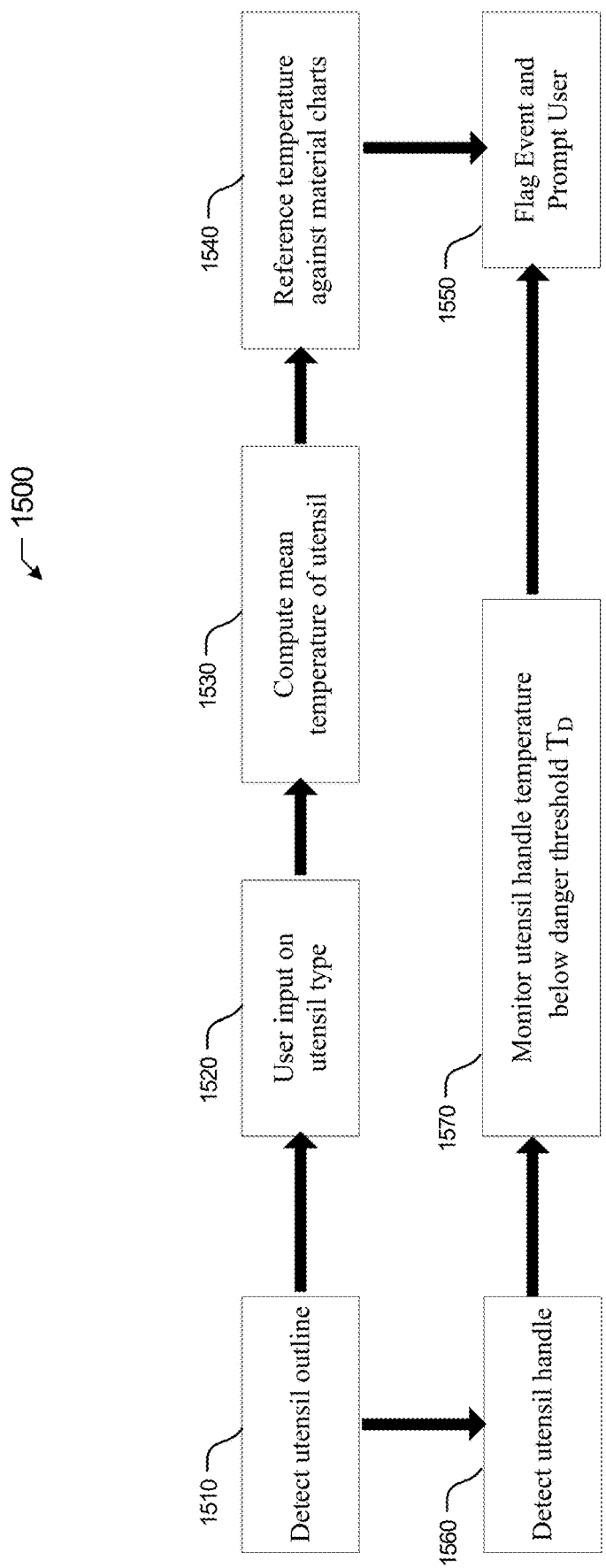
FIG. 15 illustrates an example flow diagram for monitoring temperature of a cooking utensil.

FIG. 15 illustrates an example flow diagram 1500 for monitoring temperature of a cooking utensil. In particular embodiments, the smart hood apparatus may monitor the temperature of the bottom of the cooking utensil and the temperature of its handle. At step 1510, the smart hood apparatus may detect the utensil outline, e.g., based on Hough circle transforms or a machine-learning model. At step 1520, the smart hood apparatus may receive user input on utensil type. Material of the cooking utensil may play an important role in determining the appropriate temperature range for the cooking utensil. Upon successful detection of a utensil outline, the user may be prompted to select their type of cooking utensil from a list of common options. As an example and not by way of limitation, the type may include, but not limited to, stainless steel, cast-iron, aluminum, non-stick, copper and carbon steel. An alternative method may involve instructing the user to register all desired cooking utensils in a calibration routine where the material is inputted, and the smart hood apparatus may save the exact color histogram corresponding to each cooking utensil entered. In this scenario, the smart hood apparatus may automatically recognize the type of cooking utensil on any subsequent uses without the need for the user to input any extra information.

Figure 16:
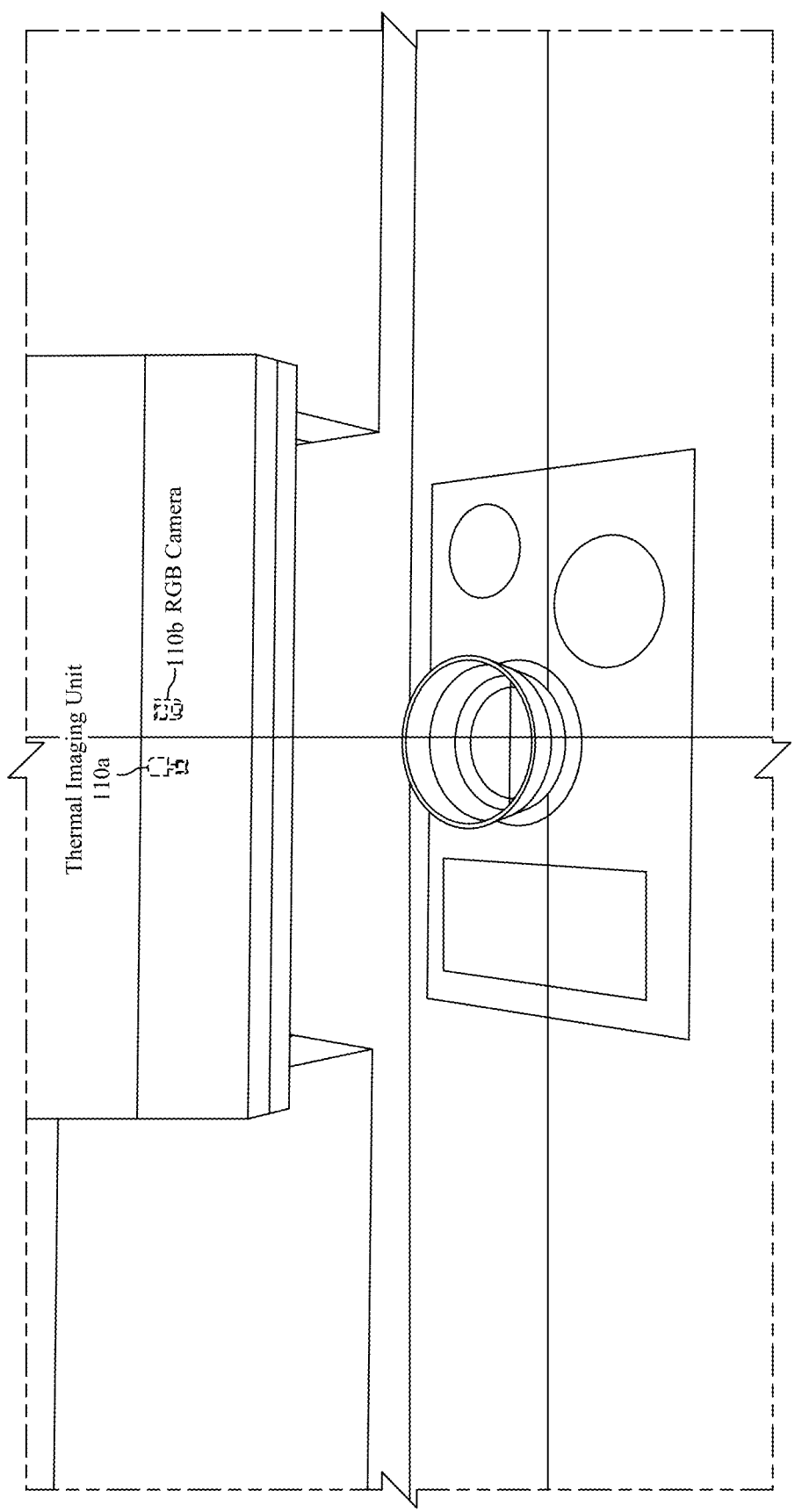
FIG. 16 illustrates an example set up of thermal imaging unit and RGB camera.

Based on the user input of the utensil type, the smart hood apparatus may be able to reference the recommended temperature range for cooking as well as the danger zone for potential toxic fume release. In particular embodiments, another way of determining the utensil type may be to use a physics-based approach to calculate the specific heat capacity of the material and cross-reference it against a list of documented specific heat capacities of possible cooking utensils. This method may rely on the thermal imaging unit 110a and RGB camera 110b. FIG. 16 illustrates an example set up of thermal imaging unit 110a and RGB camera 110b. Table 1 features the specific heat capacities of common materials of cooking utensils.

TABLE 1

Material with corresponding heat capacity.

| Material | Specific Heat Capacity |
| --- | --- |
| Cast Iron | 0.46 J · g$^{-1}$ · K$^{-1}$ |
| Stainless Steel | 0.51 J · g$^{-1}$ · K$^{-1}$ |
| Copper | 0.385 J · g$^{-1}$ · K$^{-1}$ |
| Teflon | 1.50 J · g$^{-1}$ · K$^{-1}$ |

In particular embodiments, the specific heat equation may be described below for reference:

$$Q = mc\Delta T \quad (1)$$

where Q is the heat energy (Joules), m is the mass of the substance in kilogram, c is the specific heat capacity of the substance, and $\Delta T$ is the change in temperature. Using the knowledge of the burner power level, time elapsed, temperature change (measured by the thermal camera 110a) and approximate size of the cooking utensil (measured by an extrinsically calibrated RGB camera 110b), it may be possible to solve for c. This value may then be referenced against known material values to identify the type of the cooking utensil.

At step 1530, the smart hood apparatus may compute the mean temperature of the utensil. As an example and not by way of limitation, the mean temperature of the cooking utensil may be computed based on methods such as using the utensil outline to create a circular mask within which the temperature readings from the thermal camera 110a are averaged.

At step 1540, the smart hood apparatus may reference temperature against material charts. Manufacturer instructions and professional cook may provide guidelines for utensil temperatures. A reference table may be created in software for all cooking utensil materials using this information. The key boundaries may be the optimal cooking temperature and the danger zone temperature that should not be exceeded. As an example and not by way of limitation, a sample entry in this reference table may be Teflon which is used for non-stick cookware. The manufacturer instructions may give 348° C. as the point at which the coating starts to deteriorate and potentially exhaust dangerous fumes. It may be also given that butters/cooking oils start to smoke at 204° C. Therefore, the entry for Teflon may use 330° C. as the danger zone threshold and 190° C. as the optimal cooking temperature.

When the mean utensil temperature reaches the optimal cooking temperature, an event may be triggered. At step 1550, the smart hood apparatus may flag the event and prompt the user. As an example and not by way of limitation, the user may be notified via a smartphone application, a speaker of the smart hood apparatus, or a user interface of the smart hood apparatus. A similar concept may be applied when the mean utensil temperature reaches the danger zone threshold, with the user receiving a more urgent notification due to the possible safety concern or if possible, the burner may be automatically turned down.

At step 1560 after step 1510, the smart hood apparatus may detect the utensil handle. An important safety feature may be to warn the user of a hot handle on the cooking utensil. Using both the RGB image and thermal image of the cooking utensil, the location and temperature of the handle may be determined in order to notify the user if the handle is too hot to touch. To obtain this output, the RGB and thermal sensor outputs may be used.

Figure 17:
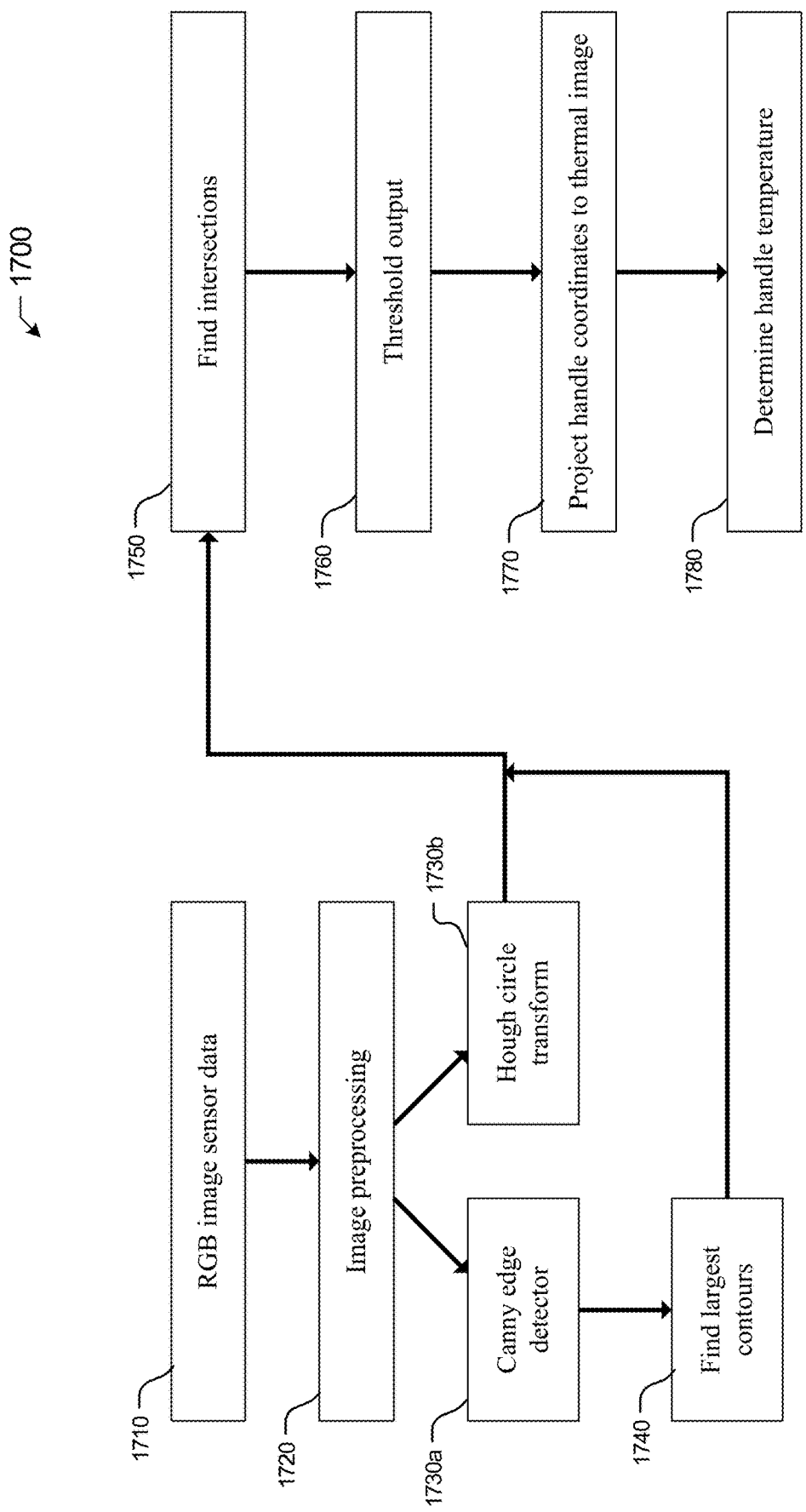
FIG. 17 illustrates an example flow diagram for determining handle temperature.

FIG. 17 illustrates an example flow diagram 1700 for determining handle temperature. At step 1710, the smart hood apparatus may access RGB image sensor data. At step 1720, the RGB image sensor data may go through image preprocessing. As an example and not by way of limitation, the preprocessing may comprise converting to a grayscale image, resizing the image to a smaller resolution, and applying a gaussian blur kernel, etc. At step 1730a, the smart hood apparatus may use Canny edge detector to obtain edges. At step 1740, the smart hood apparatus may find contours in the edged image and keep the largest contours for the next step. At step 1730b, the smart hood apparatus may identify the coordinates of the cooking utensil using the Hough circle transform of the preprocessed image. At step 1750, the smart hood apparatus may find intersections. To be more specific, the coordinates of the handle may be found by looping through the set of largest contours obtained earlier and determining the contours that intersect with the coordinates of the cooking utensil. At step 1760, the smart hood apparatus may generate a threshold output, where a simple thresholding of intersections may be used to identify the final coordinates of the cooking utensil. At step 1770, the smart hood apparatus may project handle coordinates to thermal image by using a homography. At step 1780, the smart hood apparatus may determine the handle temperature.

Figure 18:
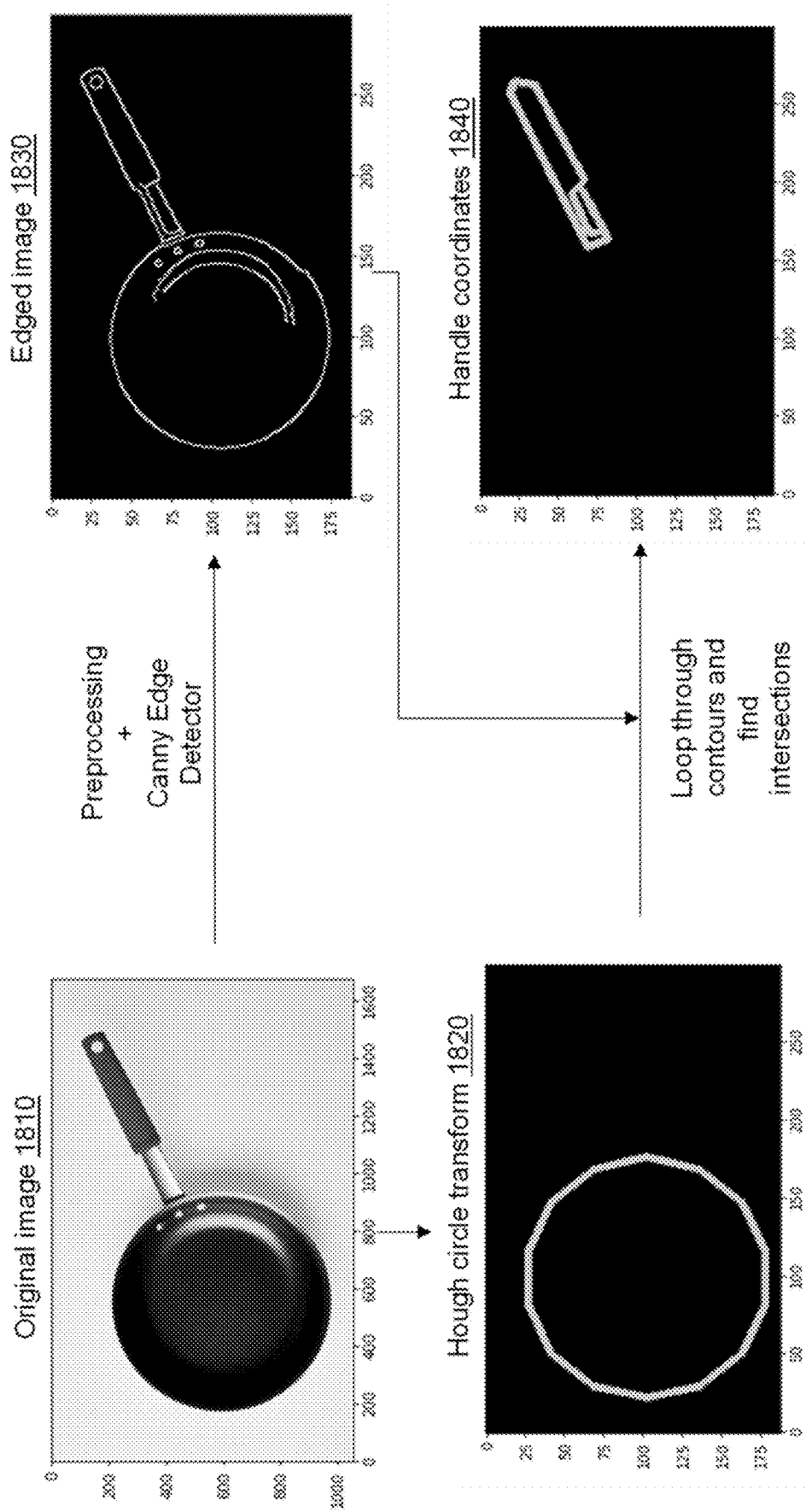
FIG. 18 illustrates an example process for handle detection using the handle detection method illustrated in FIG. 17.

FIG. 18 illustrates an example process for handle detection using the handle detection method illustrated in FIG. 17. As may be seen, based on the original image 1810, the smart hood apparatus may generate its Hough circle transform 1820. The smart hood apparatus may additionally perform image preprocessing and apply a Canny edge detector on the original image 1810, which may result in an edged image 1830. Based on the Hough circle transform 1820 and the edged image 1830, the smart hood apparatus may loop through contours and find the intersection. Subsequently, the smart hood apparatus may determine the handle coordinates as reflected by image 1840. Generating Hough circle transform for an image of a cooking utensil, applying a Canny edge detector on the image to generate an edged image, looping through contours and finding the intersection based on the Hough circle transform and the edged image, and determining the handle coordinates as reflected may be an effective solution for addressing the technical challenge of effective handle detection for monitoring its temperature since these steps effectively isolate the handle from the main body of the cooking utensil.

Back to the flow diagram 1500 in FIG. 15, another way of detecting the utensil handle at step 1560 may be to use a type of evolutionary algorithm based on the temperature value of the pixels in the thermal image. This method may rely on the thermal and RGB camera sensors, of which a sample setup is similar to the setup in FIG. 16. The evolutionary algorithm based on the temperature value of the pixels in the thermal image of the cooking utensil may be an effective solution for addressing the technical challenge of effective handle detection for monitoring its temperature as the evolutionary algorithm may search for hot thermal image pixels attached to the outline of the cooking utensil and then attempt to build a shape outwards with like-temperature pixels until a closed shape is formed, corresponding to a handle.

Figure 19:
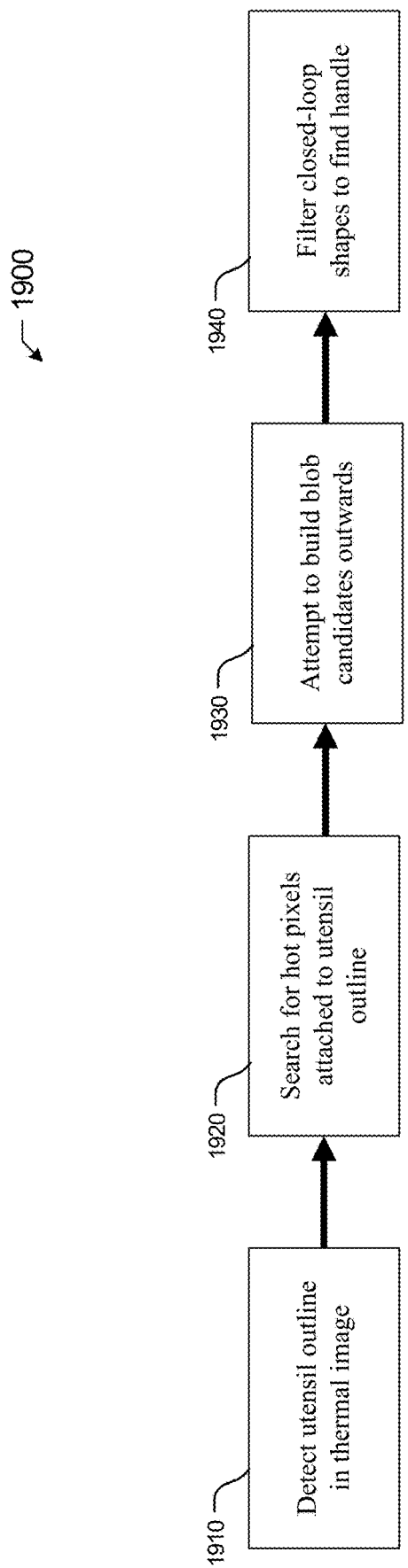
FIG. 19 illustrates an example flow diagram for using an evolutionary algorithm for handle detection.

FIG. 19 illustrates an example flow diagram 1900 for using an evolutionary algorithm for handle detection. In particular embodiments, the smart hood apparatus may detect a utensil outline of the cooking utensil. The smart hood apparatus may further detect the accessory (e.g., handle) based on the utensil outline. At step 1910, the smart hood apparatus may detect utensil outline in thermal image, e.g., by using the previously disclose methods. At step 1920, the smart hood apparatus may search for hot pixels attached to utensil outline. Knowing the utensil outline, a circular search starting at any point of the circle (e.g., most commonly at the topmost pixel) may be conducted to find any hot pixels attached to the utensil outline moving outwards. In particular embodiments, hot pixels may be defined as pixels that are close to the average temperature of the utensil mask (e.g., within a small threshold such as +/−2° C.). A noise-combating threshold may be applied to search for pixels not immediately touching the utensil outline, but within a certain small pixel distance such as 3 to 4 pixels. After each pass around the circle, a successfully smaller subset of the circle may remain where hot pixels are located (i.e., cold pixels are eliminated from contention).

At step 1930, the smart hood apparatus may attempt to build blob candidates outwards. By continuing the evolutionary algorithm, blobs of hot pixels may grow outwards from the utensil. Blobs may be tracked on a basis of being connected from the base of the original utensil circle outline. At step 1940, the smart hood apparatus may filter closed-loop shapes to find the handle. After no more hot pixels are found, any blobs that intersect each other and form a closed loop may be combined into one shape candidate. Finally, the remaining shapes may be passed through a heuristic filter to determine whether they are handles or not. As an example and not by way of limitation, the determination may be based on one or more of an approximate size, an approximate shape, or relative location to each other (i.e., two symmetric shapes located on the same straight line in the image).

Back to the flow diagram 1500 in FIG. 15, at step 1570, the smart hood apparatus may monitor the temperature of the utensil handle to make sure it is below the danger threshold $T_D$. Knowing the region of the utensil handle in the thermal camera view, the mean temperature of the handle may easily be computed by averaging the pixels in the utensil handle region. Using guidelines from regulatory bodies such as ASTM C1055 (standard guide for heated system surface conditions that produce contact burn injuries), an appropriate threshold for warning the user may be determined. As an example and not by way of limitation, 72° C./162° F. may cause irreversible injury, for which a person may feel numbness. As another example and not by way of limitation, 52° C. may cause reversible injury, for which a person may feel severe pain. Based on this information, $T_D$ may be set at 64° C., above which a person may potentially suffer irreversible burn damage. A more conservative approach may set $T_D$ at 44° C. to avoid regions of physical pain. Nevertheless, if any of the temperatures of the utensil handles reach the threshold, the user may be alerted about which handle is potentially dangerous to touch. At step 1550, the smart hood apparatus may flag such event and prompt the user. As an example and not by way of limitation, the smart hood apparatus may convey this information through a user interface which highlights the hot handle. As another example and not by way of limitation, the smart hood apparatus may alternatively alert the user through an audial description.

In particular embodiments, the smart hood apparatus may monitor smoke based on one or more air particle sensors. As an example and not by way of limitation, an air particle sensor may use a sensitive circuit to convert the change in conductivity of the gas caused by the presence of smoke into an analog output signal. This analog signal may be read and interpreted by a controller unit to give an indication of the presence of smoke. An initial calibration phase with clean air may be used to establish a baseline value for the signal, and an appropriate threshold based on testing may be set to signify the presence of smoke. In particular embodiments, the smart hood apparatus may detect smoke in the kitchen environment. The smart hood apparatus may then determine a level of the smoke exceeds a threshold level, e.g., a dangerous level. The smart hood apparatus may further send instructions for presenting a notification of the smoke exceeding the threshold level. As an example and not by way of limitation the notification may be presented to the user via a smartphone application, a user interface, or a speaker of the smart hood apparatus.

In particular embodiments, RGB and thermal views may also be investigated for the faint discoloring caused by smoke as a means of fortifying the reading from the air quality sensor. Even if smoke is expected as part of the specific dish being cooked, it may be still useful to alert the user of the presence of smoke as a safety pre-caution. If it is not expected, the user may subsequently turn down the heat to lower the emission of smoke. In particular embodiments, this feature of smoke monitoring may be integrated with smart range hood technologies to automatically increase the suction power to remove the smoke from the kitchen environment. In particular embodiments, the disclosed technologies for smoke monitoring may be extended to any air-based pathogen by modifying the sensor and threshold accordingly. As an example and not by way of limitation, another useful quantity to monitor may be carbon monoxide levels which may increase to dangerous proportions if a gas stove burner is left on without the flame.

In particular embodiments, the smart hood apparatus may provide smart cooking assistance based on various sensor information comprising the thermal data, RGB camera data, audio sensor data, depth sensor data, and air particle sensor data. The smart hood apparatus may detect one or more food items in the cooking utensil. Accordingly, the smart hood apparatus may determine a cooking assistance action based on the one or more food items. As an example and not by way of limitation, the cooking assistance action may comprise one or more of a recommended temperature to cook, a recommended time to cook, an automated timer, a food temperature regulation, or a guidance to reach one or more food finishes. In particular embodiments, the smart cooking assistance may include all possible cooking assistance tasks. The embodiments disclosed herein focus on automated timers, food temperature regulation and desired food finish guide as examples. In particular embodiments, a visual aid such as a smartphone application or a user interface may be used to display assistance information and interact with the user.

In particular embodiments, the smart hood apparatus may determine automated timers based on object detection from the RGB data along with user input to cross-reference against common scenarios. For example, an egg detected automatically or identified by the user by voice may induce a choice between finishes along with the associated timer. In particular embodiments, the smart hood apparatus may achieve food temperature regulation based on closed-loop control with the thermal sensor providing the output reading. In particular embodiments, an example for achieving desired food finishes may be illustrated in the context of cooking a burger patty which may use inputs such as surface temperature (e.g., from the thermal camera), burner level and time elapsed to guide the user as to when to flip the patty and when to stop cooking to achieve a specific finish such as medium rare. All the aforementioned functions may improve the cooking experience for users regardless of their skill levels.

Figure 20:
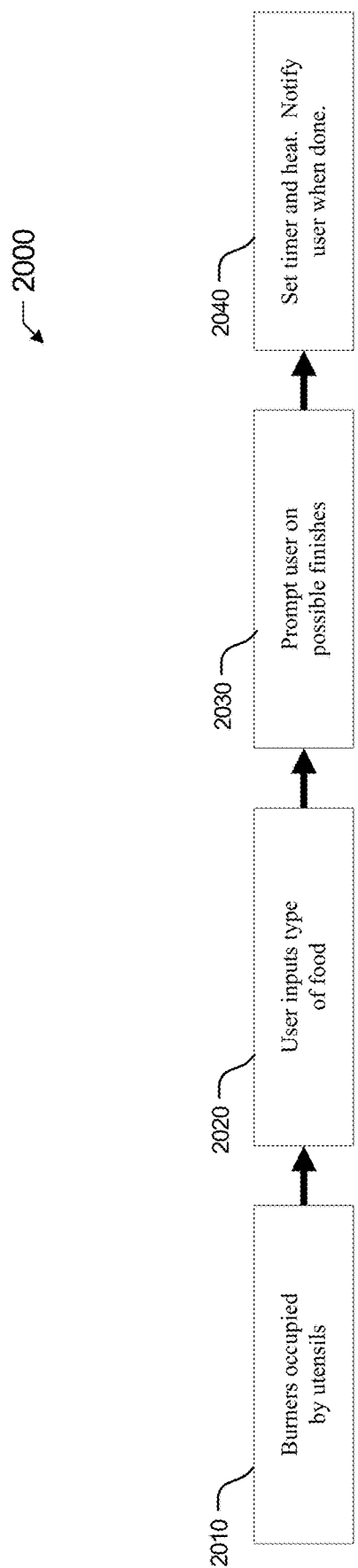
FIG. 20 illustrates an example flow diagram for automatic timers.

FIG. 20 illustrates an example flow diagram 2000 for automatic timers. At step 2010, the smart hood apparatus may detect burners occupied by utensils, i.e., determining which burners currently have a cooking utensil on them, based on the occupancy detection techniques disclosed previously. At step 2020, the user may input the type of food they desire to cook using an input medium. As an example and not by way of limitation, the input medium may take the form of a user-interface screen, an audial command or a selection menu within a smartphone application. Alternatively, the smart hood apparatus may perform object classification based on the RGB camera data to automatically detect the type of food. As an example and not by way of limitation, the smart hood apparatus may perform object detection based on a machine-learning model trained on common cooking items.

At step 2030, the smart hood apparatus may prompt the user on possible finishes. Based on the detected food, a software table may output possible finishes or cooking options for the given food. For example, if a regular egg is detected, the smart hood apparatus may prompt the user to ask if they want to hard-boil it, medium-boil it or soft-boil it. The software table may be built by combing through the possible cooking scenarios that require a timer. At step 2040, the smart hood apparatus may set the timer and heat and notify the user when it's done. Once the finish has been selected, the corresponding timer may be set and the burner may be either automatically set to the appropriate heat level (e.g., using a smart integrated knob), or the user may be prompted to do so. Automatic timers may simplify the cooking process by highlighting more options for beginners and doing some of the tedious work such as linking the type of finish to the time needed or keeping track of the timer for more experienced cooks.

In particular embodiments, food temperature regulation may relate to cooking processes that require the food items to remain within tight temperature range bounds throughout the cooking process. One specific example where this feature comes in useful may be for beef roasts where the recommended cooking temperature and times vary as follows: 130° F. for at least 121 minutes, 140° F. for at least 12 minutes, and 145° F. for at least 3 minutes.

Figure 21:
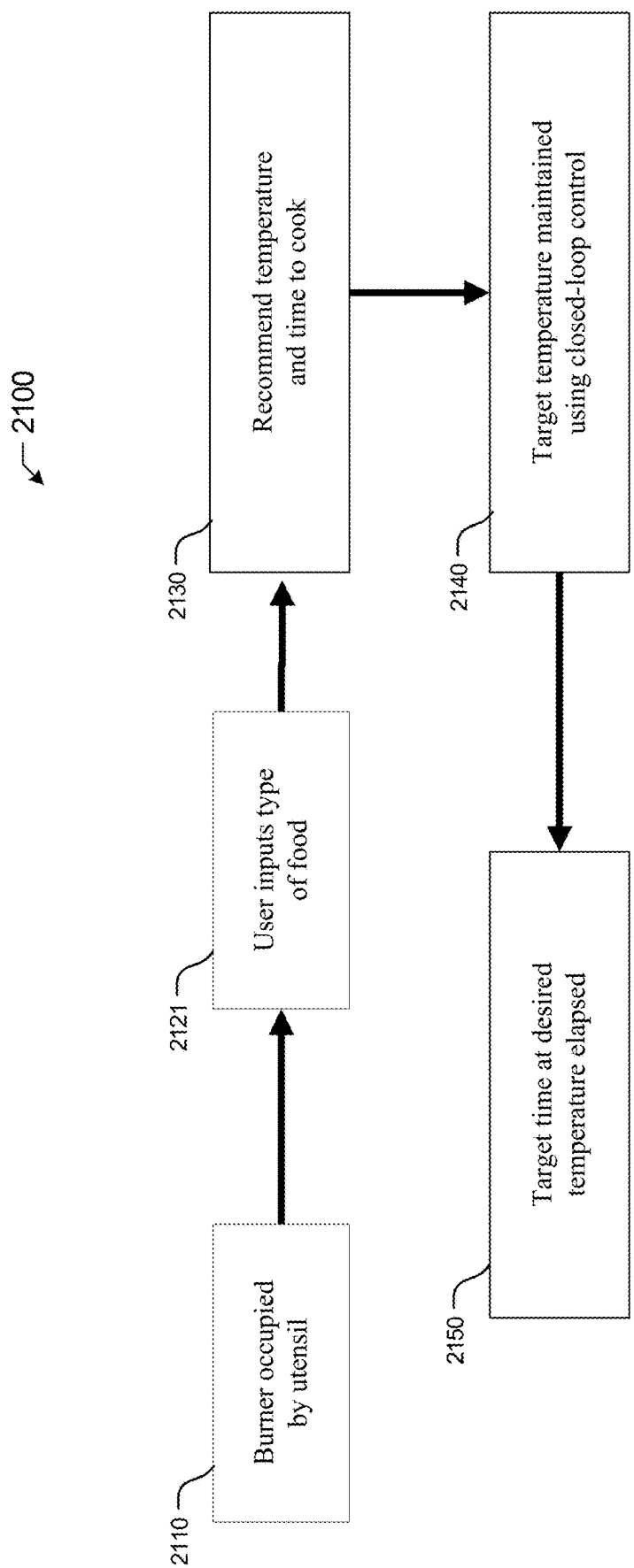
FIG. 21 illustrates an example flow diagram for food temperature regulation.

FIG. 21 illustrates an example flow diagram 2100 for food temperature regulation. At step 2110, the smart hood apparatus may detect burners occupied by utensils, i.e., determining which burners currently have a cooking utensil on them, based on the occupancy detection techniques disclosed previously. At step 2121, the user may input the type of food they desire to cook using an input medium. As an example and not by way of limitation, the input medium may take the form of a user-interface screen, an audial command or a selection menu within a smartphone application. Alternatively, the smart hood apparatus may perform object classification based on the RGB camera data to automatically detect the type of food. As an example and not by way of limitation, the smart hood apparatus may perform object detection based on a machine-learning model trained on common cooking items.

At step 2130, the smart hood apparatus may recommend temperature and time to cook. Based on the detected food items, a software table may output recommended cooking temperature and time combinations for the given food items. The user may have the ability to modify the recommendations to their particular liking. At step 2140, the smart hood apparatus may maintain the target temperature using closed-loop control. Once the required time and temperature of the food items has been selected, a closed-loop control system may be enacted to reach the desired temperature and maintain it over time. In the control system, the temperature of the food items may be found using the thermal camera data by segmenting the image to separate the food items from the bottom of the cooking utensil. In particular embodiments, segmentation may be done in either the RGB realm (and translated to the thermal realm using a homography) or directly in the thermal realm. As an example and not by way of limitation, the segmentation may be based on methods including a deterministic approach (e.g., using a watershed algorithm) or a machine-learning model that is able to analyze an image and separate the food item from the cooking utensil. The result of the segmentation may be a pixel-level mask corresponding to the food item in the cooking utensil.

In particular embodiments, the mean temperature of the food items may be determined by averaging the pixels contained in the mask in the thermal image. This piece of information may act as the output of the control system while the burner power level may act as the input. Other temperature sensing methods like an infrared temperature sensor or temperature probe may be used for this purpose as well. In particular embodiments, the burner may either be controlled automatically if a smart knob accessory is present (in which case a software PID loop may be used) or by a human (in which case an interactive feedback method may be used to guide the user through burner adjustments). At step 2050, the smart hood apparatus may determine that the target time at desired temperature is elapsed. Once the target time has elapsed while the desired temperature has been maintained within a reasonable degree of accuracy (for instance +/−2° C.), the process may be complete and the user may be alerted through a notification medium like a smartphone application or via audial cues.

Figure 22:
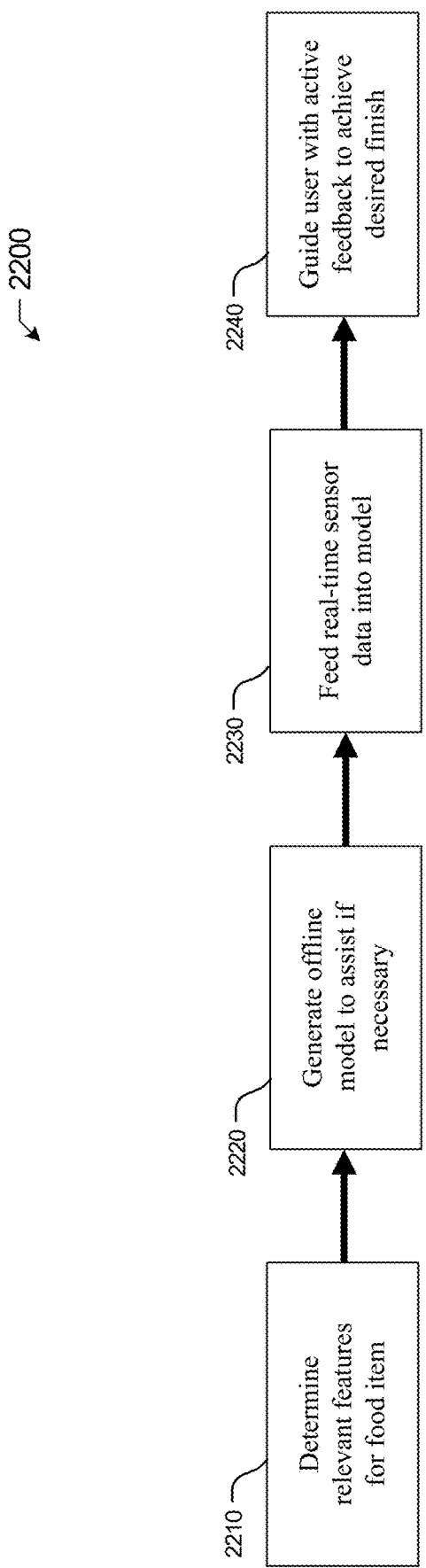
FIG. 22 illustrates an example flow diagram for food classification.

FIG. 22 illustrates an example flow diagram 2200 for food classification. In particular embodiments, the smart hood apparatus may perform food classification which covers a broad range of food items given the vast options available when it comes to cooking and recipes. The flow diagram 2200 illustrates a general approach to tackling any particular food classification task, with a focus on achieving a desired finish for the food items. In order to explain the flow diagram 2200 in more concrete terms, a specific example of a burger patty may be used which also gives some intuition as to what type of relevant features may be selected.

At step 2210, the smart hood apparatus may determine relevant features for food item. For a burger patty, the overall goal may be to achieve a specific internal temperature corresponding to the desired finish. For example, an internal temperature between 120-125° F. may indicate a rare patty while an internal temperature between 150-155° F. may indicate a medium well patty. Factors that relate to the internal temperature and the rate of internal temperature increase may include, but not limited to, patty diameter, patty thickness, surface temperature and visual appearance. It may be assumed that either the user inputs the type of food item, or a type of object classifier is run to automatically detect the type of food item. The type of finish may be inputted by the user via a medium like a smartphone application or a user interface.

At step 2220, the smart hood apparatus may generate offline model to assist if necessary. In particular embodiments, most of the features may be obtained using the real-time sensors 110. As an example and not by way of limitation, the patty diameter may be obtained from an extrinsically calibrated RGB camera 110*b*, the patty thickness may be determined using a depth sensor 110*d* and the surface temperature may be determined using the thermal sensor 110*a*. However, one technical challenge may include finding the relation between these variables and the parameter of interest which is the internal temperature. To address this technical challenge, offline experiments may be conducted where the real-time sensor data is gathered in unison with an internal temperature probe which logs data about the internal temperature of the patty. In particular embodiments, the experimental data may be analyzed to generate an offline model relating the real-time variables obtainable from the sensor brigade to an important parameter (with respect to the process used to achieve the desired finish). In the case of the burger patty, the real-time sensor information is used to compute an accurate estimate of the internal temperature of the patty.

At step 2230, the smart hood apparatus may feed real-time sensor data into a model. The model may process the sensor data to obtain the relevant features for the food item. At step 2240, the smart hood apparatus may guide the user with active feedback to achieve desired finish. In particular embodiments, the smart hood apparatus may track the trajectory of the food item features over time. In most cases, the user may need to interact with the food item to maintain the correct trajectory of the food item to achieve its desired finish. The mode of interaction may vary depending on the specific food item. As an example and not by way of limitation, for a burger patty, the user may be prompted to flip the patty at certain time intervals or adjust the burner power to re-align the process with the optimal path determined by the smart hood apparatus.

A common objective while cooking may be to determine whether a food item is fully cooked. In particular embodiments, the smart hood apparatus may use the previously disclosed food finish assistance feature to achieve a more rudimentary approach to simply distinguish between cooked or not cooked. As an example and not by way of limitation, when cooking a burger patty, the color of the meat may be used to inform one visually if the patty is fully cooked. A pinkish-red color may mean the patty is raw and a brown-black color may mean the patty is cooked on the outside. Similarly to how humans determine cook level, a color histogram-based model may be used to determine if a patty is cooked based on the color characteristics from an image. This method may rely on the thermal imaging unit 110*a* and RGB camera 110*b* using a sample setup similar to the one shown in FIG. 16.

Figure 23:
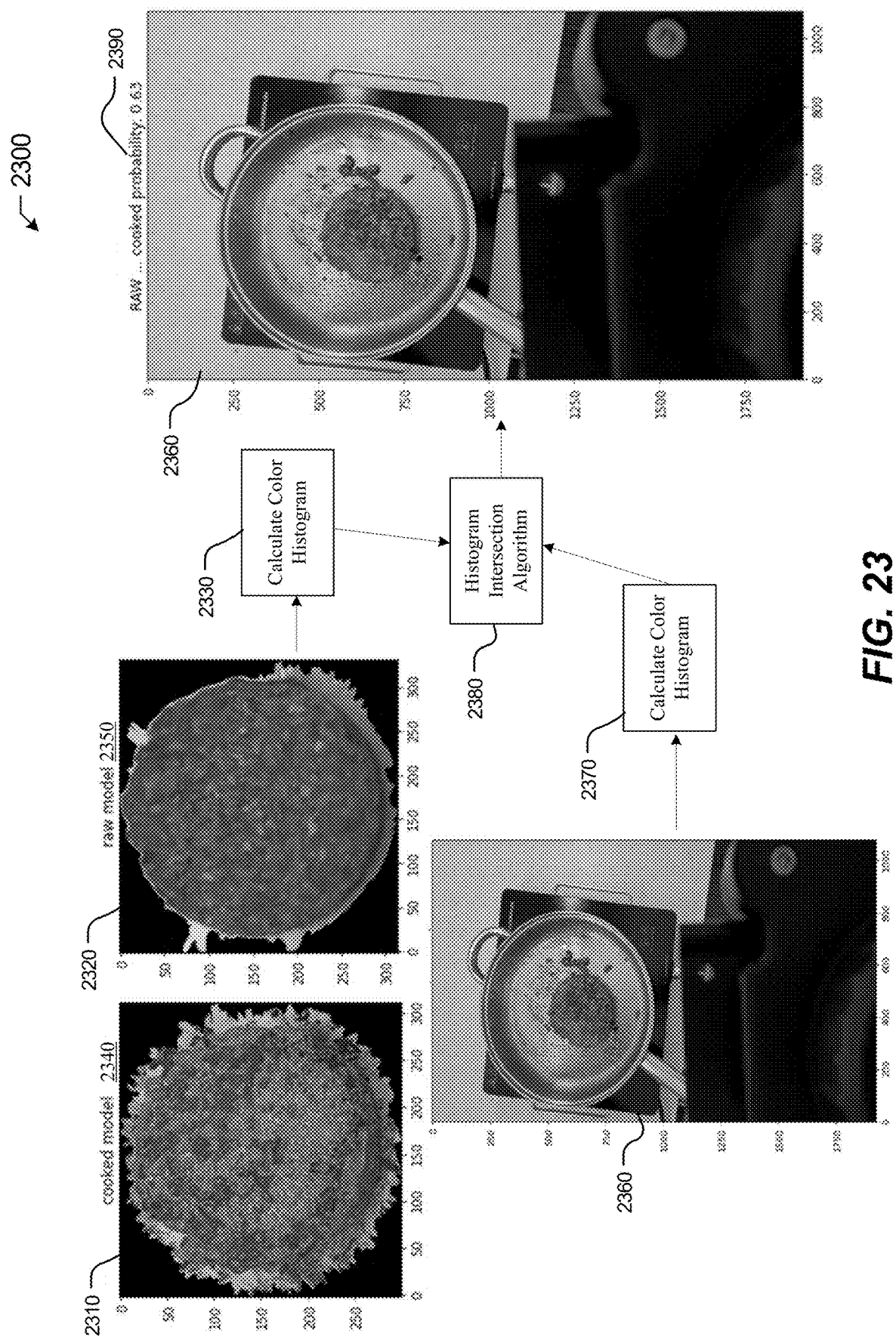
FIG. 23 illustrates an example process to predict hamburger patty doneness.

In particular embodiments, to determine whether a food item such as a patty is fully cooked, the smart hood apparatus may generate two models, one for cooked food item and one for raw food item. A representative RGB image of a cooked patty may be first taken and preprocessed to isolate the patty in the image and resize it to a given resolution. Then a color histogram of the image may be computed to use by the model for cooked food items. The same process may be repeated for the raw patty image to be used by the model for raw food items. At inference time, the color histogram of the test image may be computed from the RGB camera 110*b*. The histogram intersection algorithm may be used to compare the test histogram to each of the two models and store the results in a comparison array. Next, the probability associated with each model in the comparison array may be computed. The highest probability may be compared against a threshold value. If it is higher than the threshold, the model category associated with the value may be predicted. FIG. 23 illustrates an example process 2300 to predict hamburger patty doneness. The smart hood apparatus may take an image of a cooked patty 2310 and an image of a raw patty 2320. The smart hood apparatus may then calculate a color histogram 2330*a* of the image of the cooked patty using the cooked model 2340 and calculate a color histogram 2330*b* of the image of the raw patty 2320 using the raw model 2350, respectively. The color histogram 2330*a* and the color histogram 2330*b* may be two different color histograms. At inference time, the smart hood apparatus may take an image of patty being cooked 2360 and calculate a color histogram 2370 of it. The smart hood apparatus may then apply a histogram intersection algorithm 2380 on the color histograms of the image of cooked patty, image of raw patty, and image of patty being cooked. Subsequently, the smart hood apparatus may generate a prediction 2390, e.g., "raw, cooked probability: 0.63".

In particular embodiments, a convolutional neural network (CNN) may be used to classify food doneness. From the previously mentioned example of the burger patty, color information may be used to determine doneness. CNN may be used to classify food doneness since they excel at extracting features from images. To train a model to predict the two previously mentioned classes: cooked and raw, a large dataset of images may be first generated that sufficiently capture the variation in the two classes. The dataset may be then split into train, validation, and test sets. During training, an image classification model may be trained on the train split and evaluation may be performed on the validation set. The test set may be used to predict final performance.

Figure 24A:
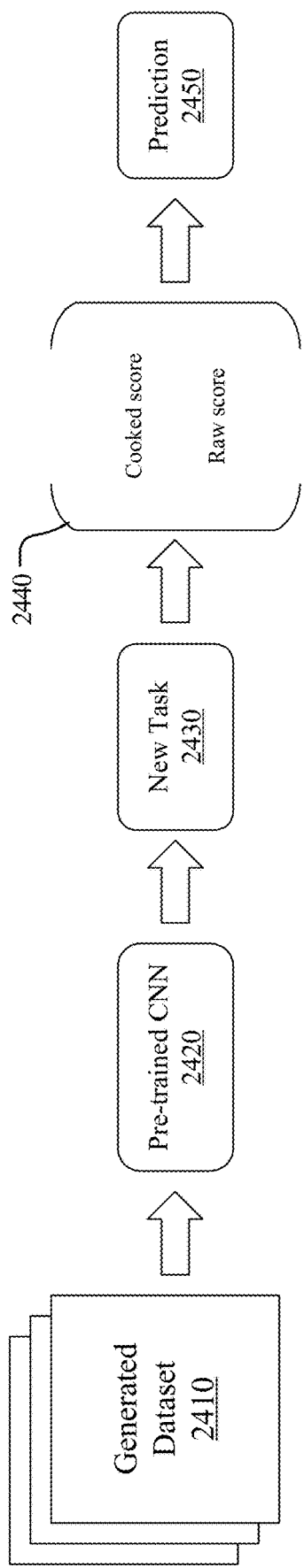
FIG. 24A illustrates an example flow diagram of transfer learning for classifying food doneness.
Figure 24B:
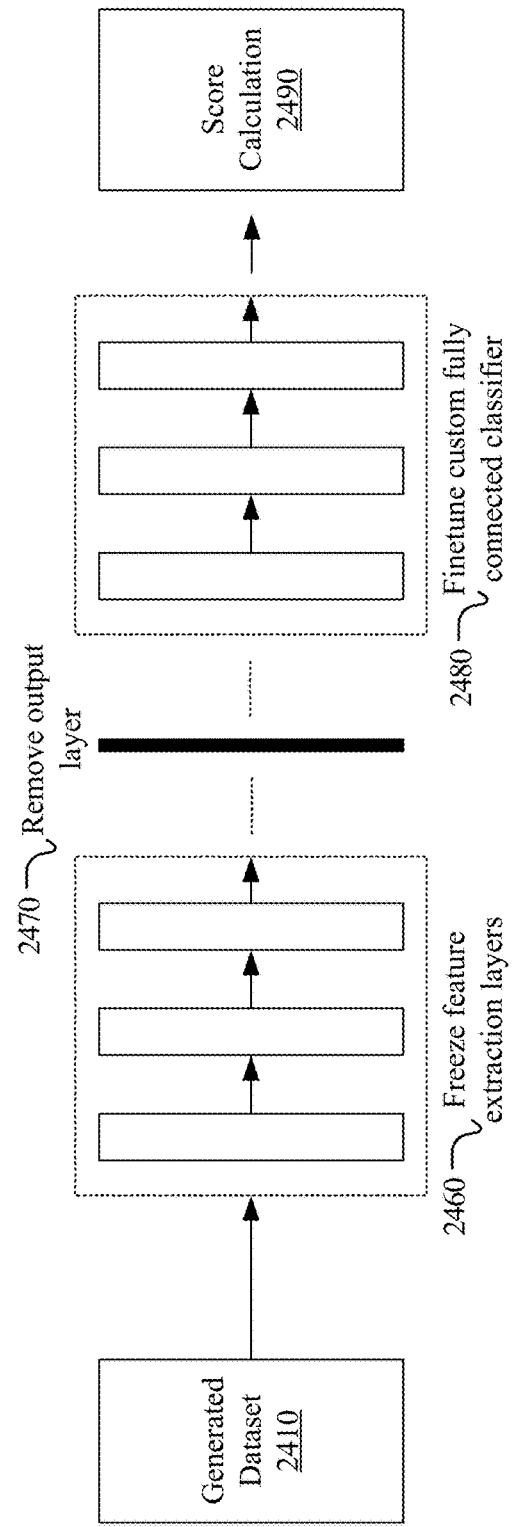
FIG. 24B illustrates an example process of model adaptation.

In particular embodiments, the image classification model may be pretrained on a large-scale image dataset such as ImageNet and transfer learning may be used to adapt the model to output the desired dataset classes. FIG. 24A illustrates an example flow diagram of transfer learning for classifying food doneness. During training, the image classification model may be trained on the train set and the evaluation may be performed on the validation set. The test set may be used to evaluate final performance. In particular embodiments, the generated dataset 2410 may be input to a pre-trained CNN 2420. The pre-trained CNN 2420 may be pre-trained on a large-scale image dataset such as ImageNet. We may then use transfer learning to adapt the pre-trained CNN 2420 based on the new task 2430 (i.e., classification of food doneness) to output scores 2440 for different classes such as cooked score and raw score. The scores 2440 may be further used to make the final prediction 2450. FIG. 24B illustrates an example process of model adaption. In particular embodiments, when inputting the generated dataset 2410 to the pre-trained CNN 2420, the following operations may occur during for the transfer learning. The convolutional neural network may freeze the feature extraction layers 2460, remove the output layer 2470, and finetune the custom fully connected classifier 2480. The finetuned custom fully connected classifier may be used for score calculation 2490.

Figure 25:
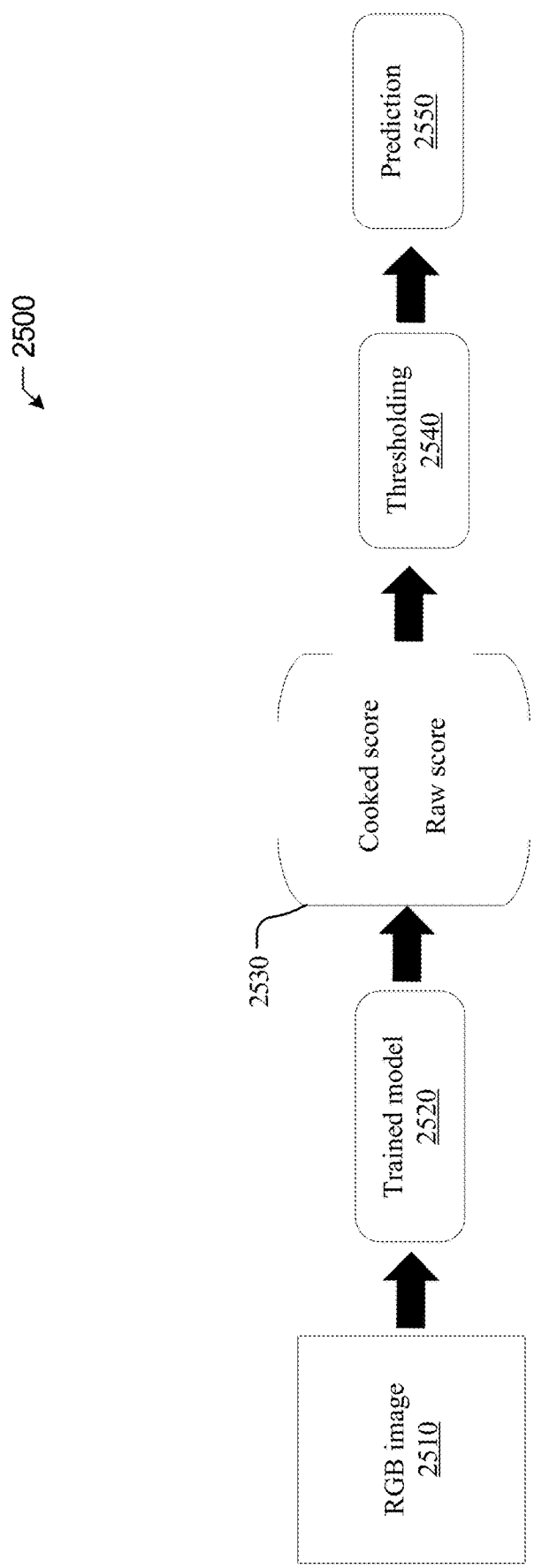
FIG. 25 illustrates an example flow diagram for inferring food doneness.

FIG. 25 illustrates an example flow diagram 2500 for inferring food doneness. For inference, the input RGB image 2510 may be passed through the trained model 2520 obtained using the process detailed in FIGS. 23A-23B. The trained model 2520 may output a vector of confidence scores 2530 that sum up to 1.0. For example, the scores may comprise cooked score and raw score. In particular embodiments, the smart hood apparatus may perform thresholding 2540. After the thresholding 2540, the score with the highest value may be output as the final prediction 2550. An image classification model based on a convolutional neural network (CNN) may be an effective solution for addressing the technical challenge of effective classification of food doneness as the output layer of the CNN may be the prediction vector that gives two classes including cooked and raw, with corresponding confidence levels.

The embodiments disclosed herein may be suitable for a variety of use cases. One use case may be the consumer kitchen. The low-cost and universal retrofit capabilities of the smart hood apparatus may allow it to easily be installed on any existing range hood. The addition of the smart hood apparatus may improve the cooking experience regardless of the skill level of the user. By providing a wide range of occupancy-detection based reminders/prompts, the smart hood apparatus may improve the safety of the kitchen while also saving the user time. For example, there would be no more cases of waiting 30 minutes while the pot was on the wrong burner or having a corner of the pot contents undercooked due to poor pot placement on the burner.

In terms of monitoring temperature of cooking utensils and smoke, the embodiments disclosed herein may provide a concrete and repeatable way of pre-heating a cooking utensil to the ideal cooking temperature. On the safety side, the user may be protected from burning themselves on hot handles and the temperature of the cooking utensil may be monitored carefully to prevent any release of harmful fumes at high temperatures. Furthermore, the capability of automatically detecting smoke and alerting the user as a precaution may be useful from both a safety standpoint (in case of a potential fire) and from a cooking perspective (if smoke is not expected for a recipe).

Furthermore, the smart cooking assistance provided by the embodiments disclosed herein may simplify the cooking experience for the user by leveraging existing cooking guidelines in an automated manner, thereby taking the burden off the user to remember exact timings for common tasks. Selecting a particular finish for a food item may now automatically spawn the correct timer for a simpler task like boiling an egg. In the case of a more complicated cooking task such as cooking a burger patty, step-by-step instructions may be given to achieve the desired finish.

Another use case may be to transfer the sensor apparatus and algorithms associated with the smart hood apparatus to different mediums that also could require occupancy detection, temperature monitoring for cooking utensils, smoke monitoring, or smart cooking assistance. This may include industrial commercial kitchens, barbeques, air fryers, convection ovens and microwaves, etc. The sensor apparatus in each use case may be mounted on the ceiling/top of the container in question and similar functionality may be achieved via slight modifications to the respective algorithms.

Figure 26:
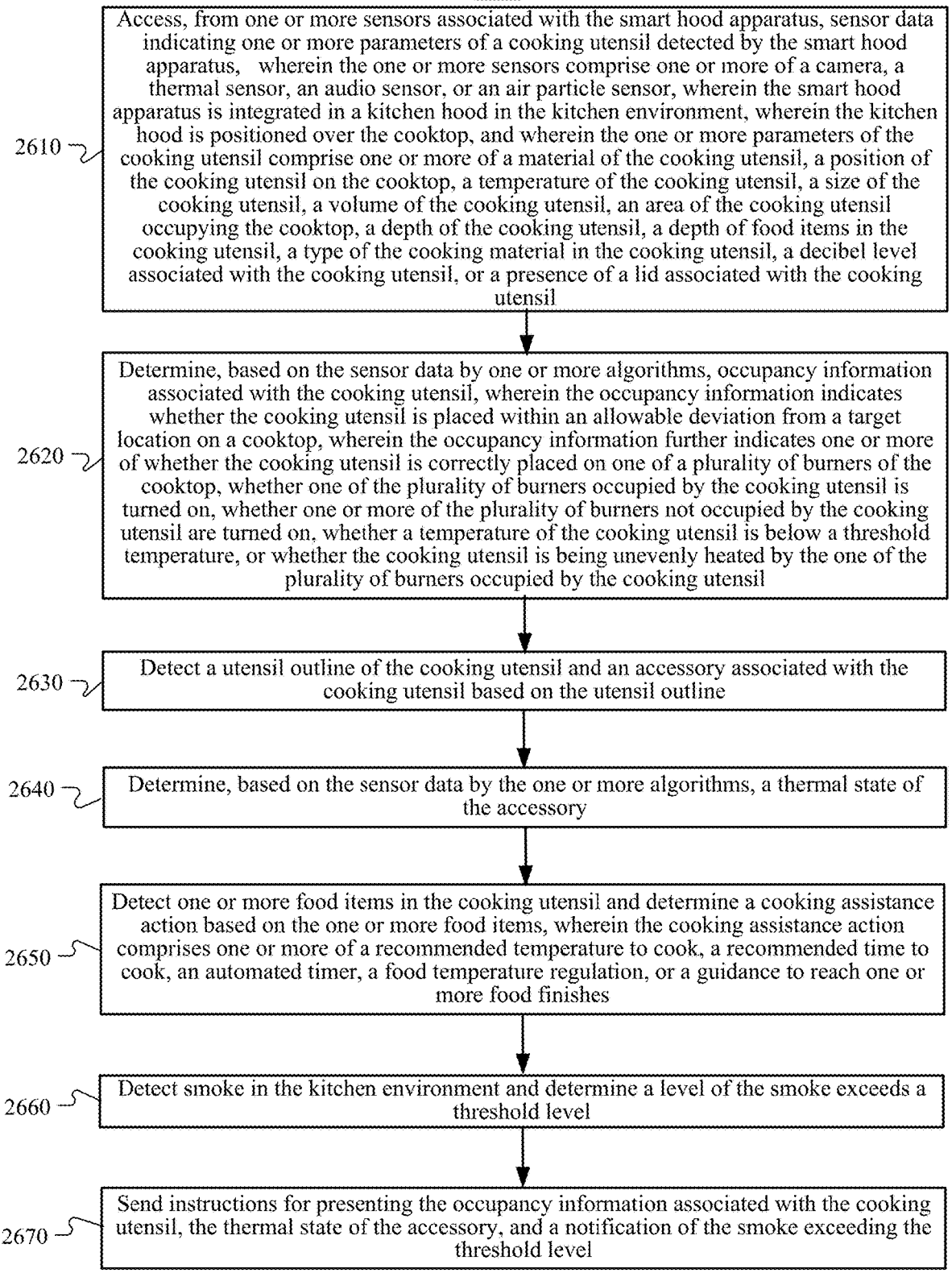
FIG. 26 illustrates is a flow diagram of a method for real-time occupancy detection and temperature monitoring of cooking utensils, in accordance with the presently disclosed embodiments.

FIG. 26 illustrates is a flow diagram of a method for real-time occupancy detection and temperature monitoring of cooking utensils, in accordance with the presently disclosed embodiments. The method 2600 may be performed utilizing one or more processing devices (e.g., the smart hood apparatus) that may include hardware (e.g., a sensor, a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing sensor data, software (e.g., instructions running/executing on one or more processors), firmware (e.g., microcode), or some combination thereof.

The method 2600 may begin at step 2610 with the one or more processing devices (e.g., the smart hood apparatus). For example, in particular embodiments, the smart hood apparatus may access, from one or more sensors 110 associated with the smart hood apparatus, sensor data indicating one or more parameters of a cooking utensil detected by the smart hood apparatus, wherein the one or more sensors 110 comprise one or more of a camera, a thermal sensor, an audio sensor, or an air particle sensor, wherein the smart hood apparatus is integrated in a kitchen hood in the kitchen environment, wherein the kitchen hood is positioned over the cooktop, and wherein the one or more parameters of the cooking utensil comprise one or more of a material of the cooking utensil, a position of the cooking utensil on the cooktop, a temperature of the cooking utensil, a size of the cooking utensil, a volume of the cooking utensil, an area of the cooking utensil occupying the cooktop, a depth of the cooking utensil, a depth of food items in the cooking utensil, a type of the cooking material in the cooking utensil, a decibel level associated with the cooking utensil, or a presence of a lid associated with the cooking utensil. The method 2600 may then continue at step 2620 with the one or more processing devices (e.g., the smart hood apparatus). For example, in particular embodiments, the smart hood apparatus may determine, based on the sensor data by one or more algorithms, occupancy information associated with the cooking utensil, wherein the occupancy information indicates whether the cooking utensil is placed within an allowable deviation from a target location on a cooktop, wherein the occupancy information further indicates one or more of whether the cooking utensil is correctly placed on one of a plurality of burners of the cooktop, whether one of the plurality of burners occupied by the cooking utensil is turned on, whether one or more of the plurality of burners not occupied by the cooking utensil are turned on, whether a temperature of the cooking utensil is below a threshold temperature, or whether the cooking utensil is being unevenly heated by the one of the plurality of burners occupied by the cooking utensil. The method 2600 may then continue at step 2630 with the one or more processing devices (e.g., the smart hood apparatus). For example, in particular embodiments, the smart hood apparatus may detect a utensil outline of the cooking utensil and an accessory associated with the cooking utensil based on the utensil outline. The method 2600 may then continue at block 2640 with the one or more processing devices (e.g., the smart hood apparatus). For example, in particular embodiments, the smart hood apparatus may determine, based on the sensor data by the one or more algorithms, a thermal state of the accessory. The method 2600 may then continue at step 2650 with the one or more processing devices (e.g., the smart hood apparatus). For example, in particular embodiments, the smart hood apparatus may detect one or more food items in the cooking utensil and determine a cooking assistance action based on the one or more food items, wherein the cooking assistance action comprises one or more of a recommended temperature to cook, a recommended time to cook, an automated timer, a food temperature regulation, or a guidance to reach one or more food finishes. The method 2600 may then continue at step 2660 with the one or more processing devices (e.g., the smart hood apparatus). For example, in particular embodiments, the smart hood apparatus may detect smoke in the kitchen environment and determine a level of the smoke exceeds a threshold level. The method 2600 may then continue at step 2670 with the one or more processing devices (e.g., the smart hood apparatus). For example, in particular embodiments, the smart hood apparatus may send instructions for presenting the occupancy information associated with the cooking utensil, the thermal state of the accessory, and a notification of the smoke exceeding the threshold level. Particular embodiments may repeat one or more steps of the method of FIG. 26, where appropriate. Although this disclosure describes and illustrates particular steps of the method of FIG. 26 as occurring in a particular order, this disclosure contemplates any suitable steps of the method of FIG. 26 occurring in any suitable order. Moreover, although this disclosure describes and illustrates an example method for real-time occupancy detection and temperature monitoring of cooking utensils including the particular steps of the method of FIG. 26, this disclosure contemplates any suitable method for real-time occupancy detection and temperature monitoring of cooking utensils including any suitable steps, which may include all, some, or none of the steps of the method of FIG. 26, where appropriate. Furthermore, although this disclosure describes and illustrates particular components, devices, or systems carrying out particular steps of the method of FIG. 26, this disclosure contemplates any suitable combination of any suitable components, devices, or systems carrying out any suitable steps of the method of FIG. 26.

Systems and Methods

Figure 27:
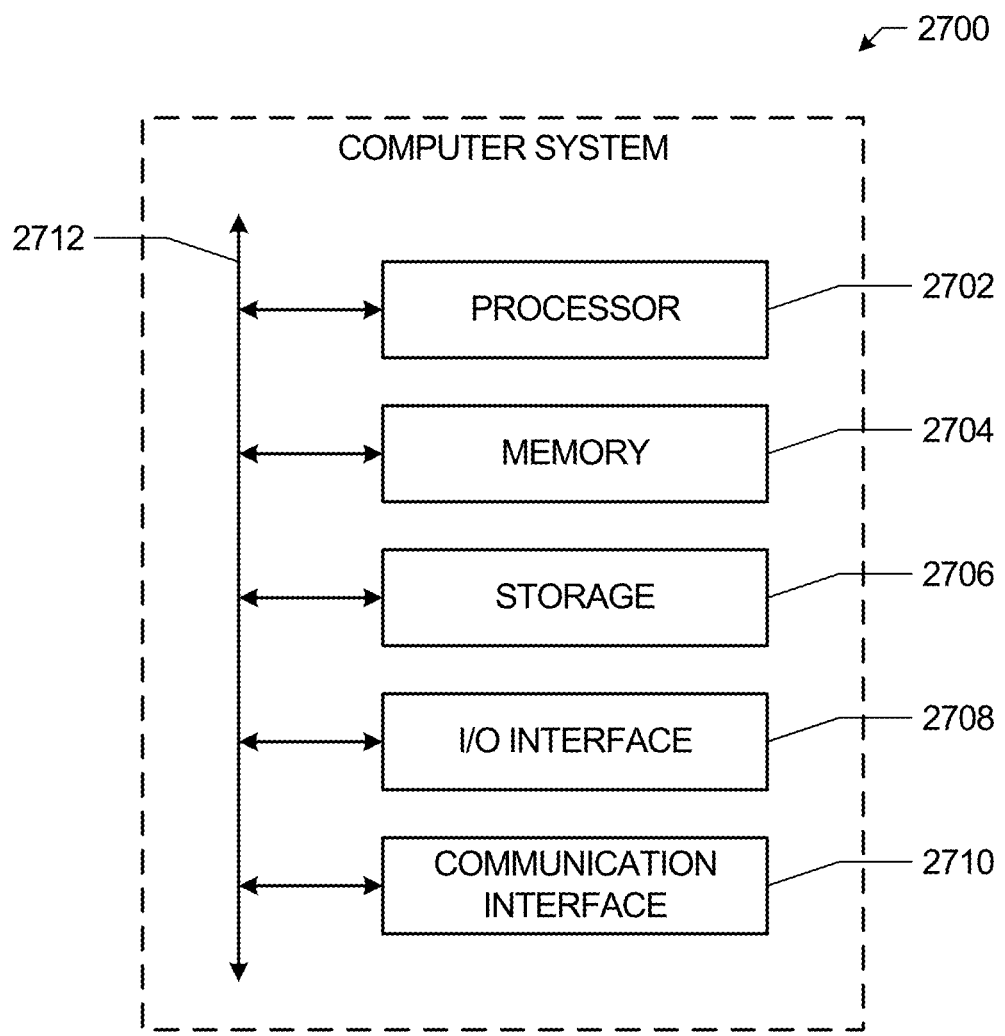
FIG. 27 illustrates an example computer system.

FIG. 27 illustrates an example computer system 2700 that may be utilized to perform real-time occupancy detection and temperature monitoring of cooking utensils, in accordance with the presently disclosed embodiments. In particular embodiments, one or more computer systems 2700 perform one or more steps of one or more methods described or illustrated herein. In particular embodiments, one or more computer systems 2700 provide functionality described or illustrated herein. In particular embodiments, software running on one or more computer systems 2700 performs one or more steps of one or more methods described or illustrated herein or provides functionality described or illustrated herein. Particular embodiments include one or more portions of one or more computer systems 2700. Herein, reference to a computer system may encompass a computing device, and vice versa, where appropriate. Moreover, reference to a computer system may encompass one or more computer systems, where appropriate.

This disclosure contemplates any suitable number of computer systems 2700. This disclosure contemplates computer system 2700 taking any suitable physical form. As example and not by way of limitation, computer system 2700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2700 may include one or more computer systems 2700; be unitary or distributed; span multiple locations; span multiple machines; span multiple data centers; or reside in a cloud, which may include one or more cloud components in one or more networks.

Where appropriate, one or more computer systems 2700 may perform without substantial spatial or temporal limitation one or more steps of one or more methods described or illustrated herein. As an example, and not by way of limitation, one or more computer systems 2700 may perform in real time or in batch mode one or more steps of one or more methods described or illustrated herein. One or more computer systems 2700 may perform at different times or at different locations one or more steps of one or more methods described or illustrated herein, where appropriate.

In particular embodiments, computer system 2700 includes a processor 2702, memory 2704, storage 2706, an input/output (I/O) interface 2708, a communication interface 2710, and a bus 2712. Although this disclosure describes and illustrates a particular computer system having a particular number of particular components in a particular arrangement, this disclosure contemplates any suitable computer system having any suitable number of any suitable components in any suitable arrangement. In particular embodiments, processor 2702 includes hardware for executing instructions, such as those making up a computer program. As an example, and not by way of limitation, to execute instructions, processor 2702 may retrieve (or fetch) the instructions from an internal register, an internal cache, memory 2704, or storage 2706; decode and execute them; and then write one or more results to an internal register, an internal cache, memory 2704, or storage 2706. In particular embodiments, processor 2702 may include one or more internal caches for data, instructions, or addresses. This disclosure contemplates processor 2702 including any suitable number of any suitable internal caches, where appropriate. As an example, and not by way of limitation, processor 2702 may include one or more instruction caches, one or more data caches, and one or more translation lookaside buffers (TLBs). Instructions in the instruction caches may be copies of instructions in memory 2704 or storage 2706, and the instruction caches may speed up retrieval of those instructions by processor 2702.

Data in the data caches may be copies of data in memory 2704 or storage 2706 for instructions executing at processor 2702 to operate on; the results of previous instructions executed at processor 2702 for access by subsequent instructions executing at processor 2702 or for writing to memory 2704 or storage 2706; or other suitable data. The data caches may speed up read or write operations by processor 2702. The TLBs may speed up virtual-address translation for processor 2702. In particular embodiments, processor 2702 may include one or more internal registers for data, instructions, or addresses. This disclosure contemplates processor 2702 including any suitable number of any suitable internal registers, where appropriate. Where appropriate, processor 2702 may include one or more arithmetic logic units (ALUs); be a multi-core processor; or include one or more processors 2702. Although this disclosure describes and illustrates a particular processor, this disclosure contemplates any suitable processor.

In particular embodiments, memory 2704 includes main memory for storing instructions for processor 2702 to execute or data for processor 2702 to operate on. As an example, and not by way of limitation, computer system 2700 may load instructions from storage 2706 or another source (such as, for example, another computer system 2700) to memory 2704. Processor 2702 may then load the instructions from memory 2704 to an internal register or internal cache. To execute the instructions, processor 2702 may retrieve the instructions from the internal register or internal cache and decode them. During or after execution of the instructions, processor 2702 may write one or more results (which may be intermediate or final results) to the internal register or internal cache. Processor 2702 may then write one or more of those results to memory 2704. In particular embodiments, processor 2702 executes only instructions in one or more internal registers or internal caches or in memory 2704 (as opposed to storage 2706 or elsewhere) and operates only on data in one or more internal registers or internal caches or in memory 2704 (as opposed to storage 2706 or elsewhere).

One or more memory buses (which may each include an address bus and a data bus) may couple processor 2702 to memory 2704. Bus 2712 may include one or more memory buses, as described below. In particular embodiments, one or more memory management units (MMUs) reside between processor 2702 and memory 2704 and facilitate accesses to memory 2704 requested by processor 2702. In particular embodiments, memory 2704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2704 may include one or more memory devices 2704, where appropriate. Although this disclosure describes and illustrates particular memory, this disclosure contemplates any suitable memory.

In particular embodiments, storage 2706 includes mass storage for data or instructions. As an example, and not by way of limitation, storage 2706 may include a hard disk drive (HDD), a floppy disk drive, flash memory, an optical disc, a magneto-optical disc, magnetic tape, or a Universal Serial Bus (USB) drive or a combination of two or more of these. Storage 2706 may include removable or non-removable (or fixed) media, where appropriate. Storage 2706 may be internal or external to computer system 2700, where appropriate. In particular embodiments, storage 2706 is non-volatile, solid-state memory. In particular embodiments, storage 2706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2706 taking any suitable physical form. Storage 2706 may include one or more storage control units facilitating communication between processor 2702 and storage 2706, where appropriate. Where appropriate, storage 2706 may include one or more storages 2706. Although this disclosure describes and illustrates particular storage, this disclosure contemplates any suitable storage.

In particular embodiments, I/O interface 2708 includes hardware, software, or both, providing one or more interfaces for communication between computer system 2700 and one or more I/O devices. Computer system 2700 may include one or more of these I/O devices, where appropriate. One or more of these I/O devices may enable communication between a person and computer system 2700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2706 for them. Where appropriate, I/O interface 2708 may include one or more device or software drivers enabling processor 2702 to drive one or more of these I/O devices. I/O interface 2708 may include one or more I/O interfaces 2706, where appropriate. Although this disclosure describes and illustrates a particular I/O interface, this disclosure contemplates any suitable I/O interface.

In particular embodiments, communication interface 2710 includes hardware, software, or both providing one or more interfaces for communication (such as, for example, packet-based communication) between computer system 2700 and one or more other computer systems 2700 or one or more networks. As an example, and not by way of limitation, communication interface 2710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2710 for it.

As an example, and not by way of limitation, computer system 2700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2700 may include any suitable communication interface 2710 for any of these networks, where appropriate. Communication interface 2710 may include one or more communication interfaces 2710, where appropriate. Although this disclosure describes and illustrates a particular communication interface, this disclosure contemplates any suitable communication interface.

In particular embodiments, bus 2712 includes hardware, software, or both coupling components of computer system 2700 to each other. As an example, and not by way of limitation, bus 2712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2712 may include one or more buses 2712, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for monitoring a kitchen environment comprising, by a smart hood apparatus:
    monitoring, by the smart hood apparatus, a burner zone of a cooktop, the burner zone comprising a cooktop burner;
    detecting, by one or more sensors associated with the smart hood apparatus, one or more parameters of a cooking utensil detected by the smart hood apparatus, wherein the one or more sensors comprise one or more of a camera, a thermal sensor, an audio sensor, or an air particle sensor;
    accessing, from the one or more sensors associated with the smart hood apparatus, sensor data indicating the one or more parameters of the cooking utensil detected by the smart hood apparatus;
    determining, based on the monitored burner zone and the sensor data by one or more algorithms, occupancy information associated with the burner zone and the cooking utensil, wherein the occupancy information comprises whether the cooking utensil is placed within an allowable distance deviation, along each of a plurality of axes, from a target location relative to the cooktop burner within the burner zone;
    determining, based on the sensor data by the one or more algorithms, a temperature of an accessory comprising a portion of the cooking utensil; and
    sending instructions for presenting the occupancy information associated with the cooking utensil and a description of the temperature of the accessory.

2. The method of claim 1, further comprising:
  detecting smoke in the kitchen environment;
  determining a level of the smoke exceeds a threshold level; and
  sending instructions for presenting a notification of the smoke exceeding the threshold level.

3. The method of claim 1, further comprising:
  detecting one or more food items in the cooking utensil; and
  determining a cooking assistance action based on the one or more food items, wherein the cooking assistance action comprises one or more of a recommended temperature to cook, a recommended time to cook, an automated timer, a food temperature regulation, or a guidance to reach one or more food finishes.

4. The method of claim 1, further comprising:
  detecting a utensil outline of the cooking utensil; and
  detecting the accessory based on the utensil outline.

5. The method of claim 1, wherein the occupancy information further indicates one or more of:
  whether one of the plurality of burners occupied by the cooking utensil is turned on;
  whether one or more of the plurality of burners not occupied by the cooking utensil are turned on;
  whether a temperature of the cooking utensil is below a threshold temperature; or
  whether the cooking utensil is being unevenly heated by the one of the plurality of burners occupied by the cooking utensil.

6. The method of claim 1, wherein the one or more parameters of the cooking utensil comprise one or more of:
  a material of the cooking utensil;
  a position of the cooking utensil on the cooktop;
  a temperature of the cooking utensil;
  a size of the cooking utensil;
  a volume of the cooking utensil;
  an area of the cooking utensil occupying the cooktop;
  a depth of the cooking utensil;
  a depth of food items in the cooking utensil;
  a type of the cooking material in the cooking utensil;
  a decibel level associated with the cooking utensil; or
  a presence of a lid associated with the cooking utensil.

7. The method of claim 1, wherein the smart hood apparatus is integrated in a kitchen hood in the kitchen environment, wherein the kitchen hood is positioned over the cooktop.

8. A smart hood apparatus comprising:
  one or more displays;
  one or more sensors;
  one or more non-transitory computer-readable storage media including instructions for monitoring a kitchen environment by the smart hood apparatus; and
  one or more processors coupled to the storage media, the one or more processors configured to execute the instructions to:
    monitor, by the smart hood apparatus, a burner zone of a cooktop, the burner zone comprising a cooktop burner;
    detect, by one or more sensors associated with the smart hood apparatus, one or more parameters of a cooking utensil detected by the smart hood apparatus, wherein the one or more sensors comprise one or more of a camera, a thermal sensor, an audio sensor, or an air particle sensor;
    access, from the one or more sensors associated with the smart hood apparatus, sensor data indicating the one or more parameters of the cooking utensil detected by the smart hood apparatus;
    determine, based on the monitored burner zone and the sensor data by one or more algorithms, occupancy information associated with the burner zone and the cooking utensil, wherein the occupancy information comprises whether the cooking utensil is placed within an allowable distance deviation, along each of a plurality of axes, from a target location relative to the cooktop burner within the burner zone;
    determine, based on the sensor data by the one or more algorithms, a temperature of an accessory comprising a portion of the cooking utensil; and
    send instructions for presenting the occupancy information associated with the cooking utensil and a description of the temperature of the accessory.

9. The smart hood apparatus of claim 8, wherein the processors are further configured to execute the instructions to:
  detect smoke in the kitchen environment;
  determine a level of the smoke exceeds a threshold level; and
  send instructions for presenting a notification of the smoke exceeding the threshold level.

10. The smart hood apparatus of claim 8, wherein the processors are further configured to execute the instructions to:
  detect one or more food items in the cooking utensil; and
  determine a cooking assistance action based on the one or more food items, wherein the cooking assistance action comprises one or more of a recommended temperature to cook, a recommended time to cook, an automated timer, a food temperature regulation, or a guidance to reach one or more food finishes.

11. The smart hood apparatus of claim 8, wherein the processors are further configured to execute the instructions to:
  detect a utensil outline of the cooking utensil; and
  detect the accessory based on the utensil outline.

12. The smart hood apparatus of claim 8, wherein the occupancy information further indicates one or more of:
  whether one of the plurality of burners occupied by the cooking utensil is turned on;
  whether one or more of the plurality of burners not occupied by the cooking utensil are turned on;
  whether a temperature of the cooking utensil is below a threshold temperature; or
  whether the cooking utensil is being unevenly heated by the one of the plurality of burners occupied by the cooking utensil.

13. The smart hood apparatus of claim 8, wherein the one or more parameters of the cooking utensil comprise one or more of:
  a material of the cooking utensil;
  a position of the cooking utensil on the cooktop;
  a temperature of the cooking utensil;
  a size of the cooking utensil;
  a volume of the cooking utensil;
  an area of the cooking utensil occupying the cooktop;
  a depth of the cooking utensil;
  a depth of food items in the cooking utensil;
  a type of the cooking material in the cooking utensil;
  a decibel level associated with the cooking utensil; or
  a presence of a lid associated with the cooking utensil.

14. The smart hood apparatus of claim 8, wherein the smart hood apparatus is integrated in a kitchen hood in the kitchen environment, wherein the kitchen hood is positioned over the cooktop.

15. A computer-readable non-transitory storage media comprising instructions for monitoring a kitchen environment by a smart hood apparatus, the instructions being executable by a processor to:
monitor, by the smart hood apparatus, a burner zone of a cooktop, the burner zone comprising a cooktop burner;
detect, by one or more sensors associated with the smart hood apparatus, one or more parameters of a cooking utensil detected by the smart hood apparatus, wherein the one or more sensors comprise one or more of a camera, a thermal sensor, an audio sensor, or an air particle sensor;
access, from the one or more sensors associated with the smart hood apparatus, sensor data indicating the one or more parameters of the cooking utensil detected by the smart hood apparatus;
determine, based on the monitored burner zone and the sensor data by one or more algorithms, occupancy information associated with the burner zone and the cooking utensil, wherein the occupancy information comprises whether the cooking utensil is placed within an allowable distance deviation, along each of a plurality of axes, from a target location relative to the cooktop burner within the burner zone;
determine, based on the sensor data by the one or more algorithms, a temperature of an accessory comprising a portion of the cooking utensil; and
send instructions for presenting the occupancy information associated with the cooking utensil and a description of the temperature of the accessory.

16. The computer-readable non-transitory storage media of claim 15, wherein the instructions are further executable by the processor to:
detect smoke in the kitchen environment;
determine a level of the smoke exceeds a threshold level; and
send instructions for presenting a notification of the smoke exceeding the threshold level.

17. The computer-readable non-transitory storage media of claim 15, wherein the instructions are further executable by the processor to:
detect one or more food items in the cooking utensil; and
determine a cooking assistance action based on the one or more food items, wherein the cooking assistance action comprises one or more of a recommended temperature to cook, a recommended time to cook, an automated timer, a food temperature regulation, or a guidance to reach one or more food finishes.

18. The computer-readable non-transitory storage media of claim 15, wherein the instructions are further executable by the processor to:
detect a utensil outline of the cooking utensil; and
detect the accessory based on the utensil outline.

19. The computer-readable non-transitory storage media of claim 15, wherein the occupancy information further indicates one or more of:
whether one of the plurality of burners occupied by the cooking utensil is turned on;
whether one or more of the plurality of burners not occupied by the cooking utensil are turned on;
whether a temperature of the cooking utensil is below a threshold temperature; or
whether the cooking utensil is being unevenly heated by the one of the plurality of burners occupied by the cooking utensil.

20. The computer-readable non-transitory storage media of claim 15, wherein the one or more parameters of the cooking utensil comprise one or more of:
a material of the cooking utensil;
a position of the cooking utensil on the cooktop;
a temperature of the cooking utensil;
a size of the cooking utensil;
a volume of the cooking utensil;
an area of the cooking utensil occupying the cooktop;
a depth of the cooking utensil;
a depth of food items in the cooking utensil;
a type of the cooking material in the cooking utensil;
a decibel level associated with the cooking utensil; or
a presence of a lid associated with the cooking utensil.

* * * * *